United States Patent
Yamada et al.

(10) Patent No.: US 8,085,413 B2
(45) Date of Patent: Dec. 27, 2011

(54) ADAPTOR, IMAGE SUPPLY DEVICE, PRINTING SYSTEM, AND CONTROL METHOD THEREFOR

(75) Inventors: Akitoshi Yamada, Yokohama (JP); Yusuke Hashii, Kawasaki (JP); Takao Aichi, Tokyo (JP); Kentaro Yano, Yokohama (JP); Tetsuya Suwa, Yokohama (JP); Masao Kato, Kawasaki (JP); Mitsuhiro Ono, Tokyo (JP); Arata Miyagi, Yokohama (JP); Fumihiro Goto, Kawasaki (JP); Fumitaka Goto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1111 days.

(21) Appl. No.: 11/813,629

(22) PCT Filed: Jan. 23, 2006

(86) PCT No.: PCT/JP2006/301371
§ 371 (c)(1),
(2), (4) Date: Jul. 10, 2007

(87) PCT Pub. No.: WO2006/080468
PCT Pub. Date: Aug. 3, 2006

(65) Prior Publication Data
US 2009/0002730 A1  Jan. 1, 2009

(30) Foreign Application Priority Data
Jan. 25, 2005 (JP) .................... 2005-017193

(51) Int. Cl.
*G06F 3/12* (2006.01)
*G06F 15/00* (2006.01)
*G06K 1/00* (2006.01)
*G06K 15/00* (2006.01)

(52) U.S. Cl. ....... 358/1.13; 358/1.1; 358/1.15; 358/1.14

(58) Field of Classification Search .................. 358/1.1, 358/1.13, 1.14, 1.15
See application file for complete search history.

(56) References Cited

U.S. PATENT DOCUMENTS 6,041,165 A * 3/2000 Morikawa ...................... 358/1.2
6,357,663 B1 3/2002 Takahashi et al.
(Continued)

FOREIGN PATENT DOCUMENTS

JP 8-293952 11/1996
(Continued)

OTHER PUBLICATIONS

Jun. 5, 2009 Notification of Reasons for Refusal in Japanese Application No. 2005-017193 and English translation thereof.

*Primary Examiner* — James A Thompson
*Assistant Examiner* — Jonathan Beckley
(74) *Attorney, Agent, or Firm* — Fitzpatrick, Cella, Harper & Scinto

(57) ABSTRACT

An adaptor which mediates between an image supply device and a printer causes the printer to print by selecting either of the first operation mode in which image data from the image supply device is received by wireless communication and before the completion of receiving the image data, a print job is issued to the printer by wired communication, and the second operation mode in which image data from the image supply device is received by wireless communication and after the completion of receiving the image data, a print job is issued to the printer by wired communication.

6 Claims, 31 Drawing Sheets

U.S. PATENT DOCUMENTS

| | | | |
|---|---|---|---|
| 6,369,909 B1 | 4/2002 | Shima | |
| 6,922,725 B2 * | 7/2005 | Lamming et al. | 709/227 |
| 6,927,866 B2 * | 8/2005 | Konishi | 358/1.13 |
| 7,038,801 B2 * | 5/2006 | Kurozasa et al. | 358/1.15 |
| 7,272,407 B2 * | 9/2007 | Strittmatter et al. | 455/500 |
| 7,289,141 B2 | 10/2007 | Yamada et al. | 348/207.2 |
| 7,298,523 B2 | 11/2007 | Masumoto et al. | 358/1.6 |
| 7,318,086 B2 * | 1/2008 | Chang et al. | 709/217 |
| 2003/0156196 A1 | 8/2003 | Kato et al. | 348/207.2 |
| 2004/0021902 A1 | 2/2004 | Ogiwara et al. | 358/1.15 |
| 2004/0046990 A1 | 3/2004 | Yano et al. | 358/1.15 |
| 2004/0070672 A1 * | 4/2004 | Iwami et al. | 348/207.2 |
| 2004/0160632 A1 | 8/2004 | Kato et al. | 358/1.15 |
| 2004/0210691 A1 * | 10/2004 | Fujii | 710/74 |
| 2004/0252335 A1 | 12/2004 | Yano et al. | 358/1.15 |
| 2005/0024497 A1 | 2/2005 | Sakamoto et al. | 348/207.2 |
| 2005/0052686 A1 * | 3/2005 | Maruyama | 358/1.15 |
| 2005/0219555 A1 | 10/2005 | Onuma et al. | 358/1.1 |
| 2005/0275875 A1 * | 12/2005 | Jennings | 358/1.15 |
| 2006/0044395 A1 | 3/2006 | Aichi et al. | 348/207.2 |
| 2006/0098938 A1 | 5/2006 | Goto et al. | 386/46 |
| 2006/0235987 A1 | 10/2006 | Goto et al. | 709/230 |
| 2007/0133052 A1 | 6/2007 | Yamada et al. | 358/1.15 |
| 2007/0182993 A1 | 8/2007 | Yamada et al. | 358/1.15 |
| 2007/0195362 A1 | 8/2007 | Yamada et al. | 358/1.15 |
| 2008/0030754 A1 | 2/2008 | Masumoto et al. | 358/1.9 |
| 2008/0037060 A1 | 2/2008 | Ono et al. | 358/1.15 |

FOREIGN PATENT DOCUMENTS

| | | |
|---|---|---|
| JP | 9-305342 | 11/1997 |
| JP | 10-126812 | 5/1998 |
| JP | 10-309827 | 11/1998 |
| JP | 11-184649 | 7/1999 |
| JP | 2000-048177 | 2/2000 |
| JP | 2002-149535 | 5/2002 |
| JP | 2003-333579 | 11/2003 |
| JP | 03486553 | 1/2004 |
| JP | 03495845 | 2/2004 |
| JP | 03573466 | 10/2004 |
| JP | 2005-011246 | 1/2005 |

* cited by examiner

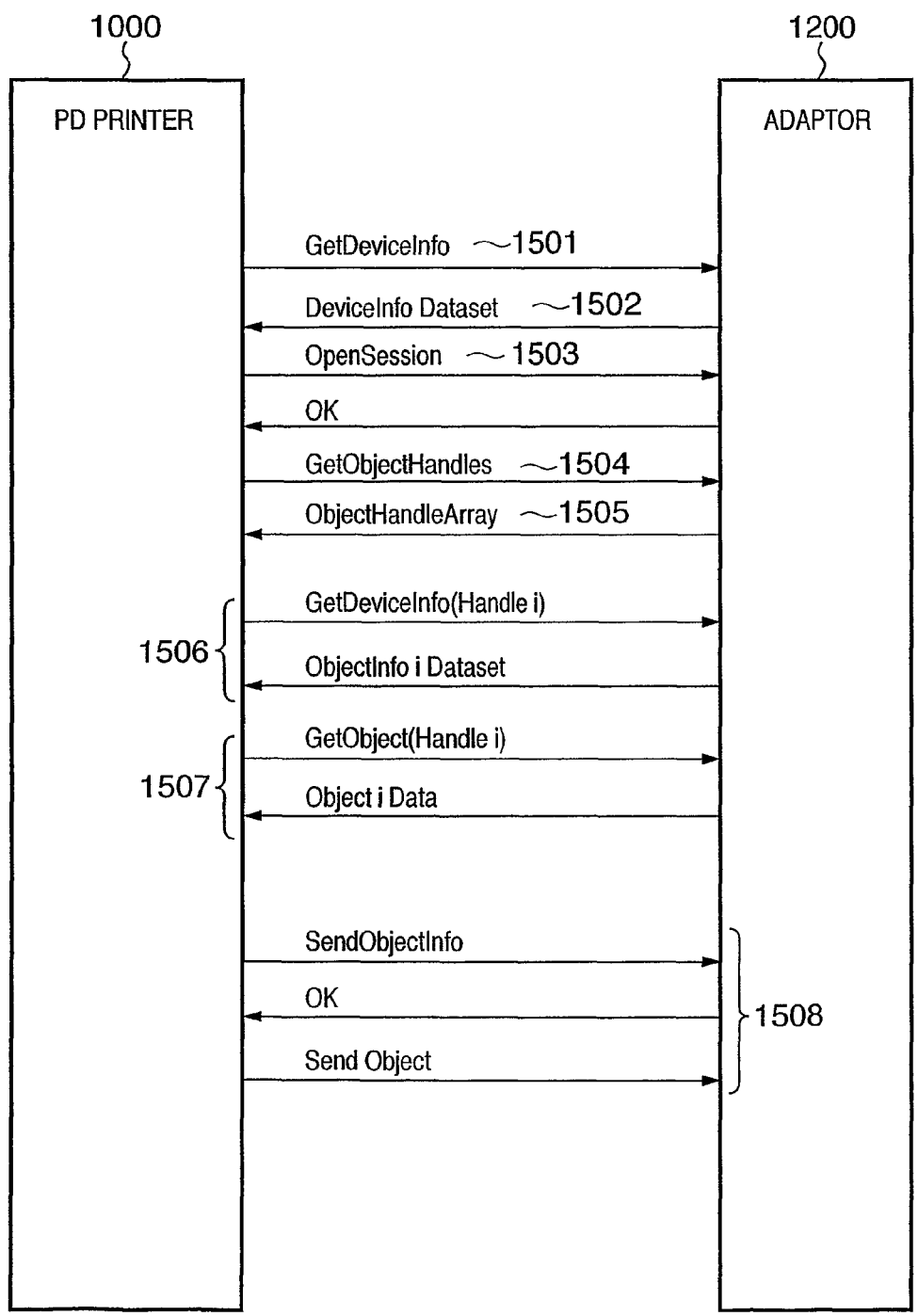

FIG. 17A

```
<Request>
    <Capability>
        <Format/>
    </RequestCapability>
</Request>
```

FIG. 17B

```
<Response>
    <Result>
        OK
    </Result>
    <Capability>
        <Format>
            JPEG
            PNG
        </Format>
    <Capability>
</Response>
```

FIG. 18A

```
<Request>
    <Job>
        <Setting>
            <Format>
                JPEG
            </Format>
        </Setting>
        <ObjectHandles>
            00000001
        </ObjectHandles>
    </Job>
</Request>
```

FIG. 18B

```
<Response>
    <Result>
        OK
    </Result>
</Response>
```

FIG. 18C

```
<Response>
    <Result>
        NG
    </Result>
</Response>
```

FIG. 19A

```
<Request>
    <Status>
        <Printer>
            Idle
        </Printer>
    </Status>
</Request>
```

FIG. 19B

```
<Response>
    <Result>
        OK
    </Result>
</Response>
```

F I G. 20
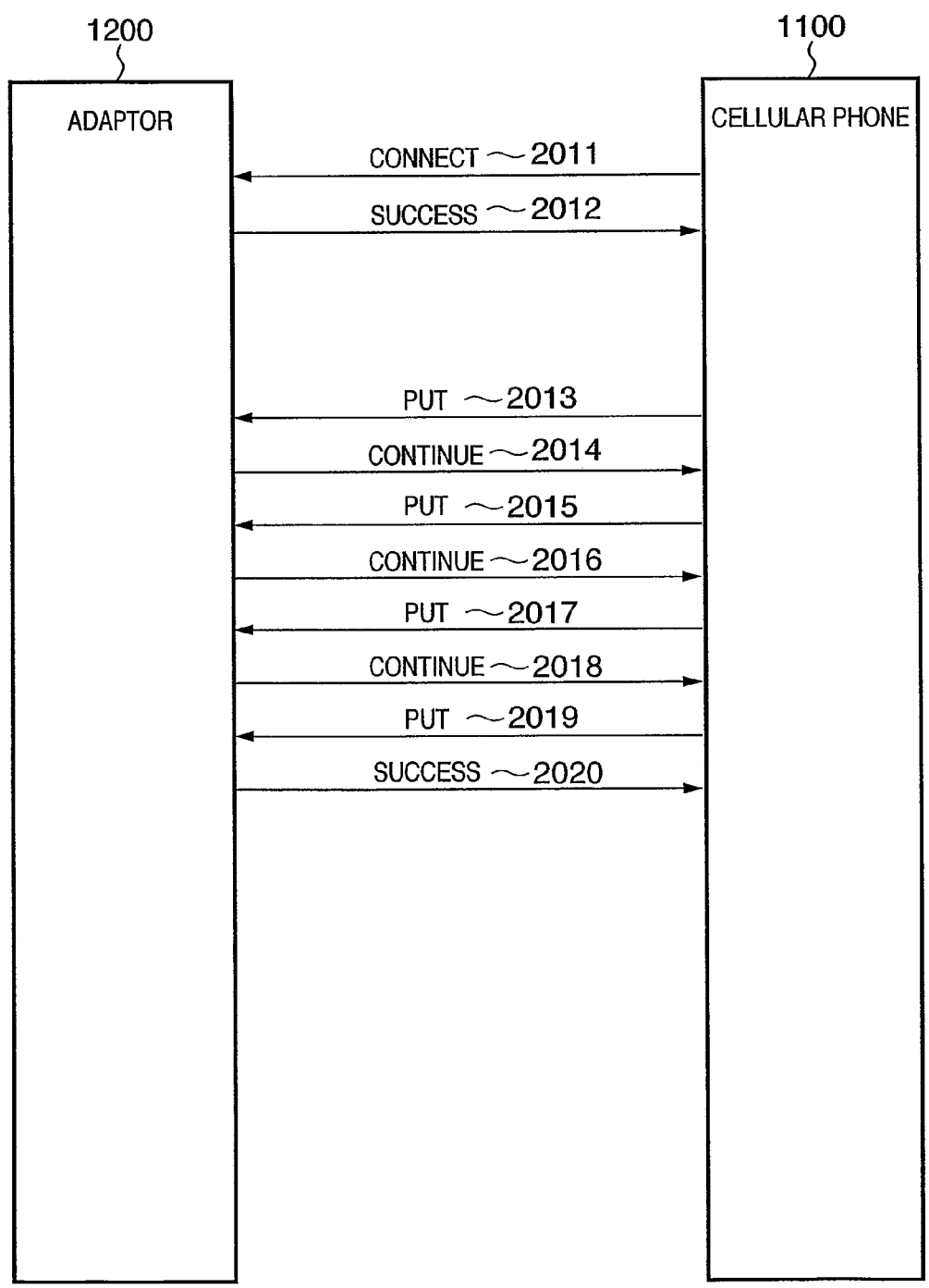

ADAPTOR, IMAGE SUPPLY DEVICE, PRINTING SYSTEM, AND CONTROL METHOD THEREFOR

TECHNICAL FIELD

The present invention relates to a printing system which prints by transmitting image data held by an image supply device to a printer via an adaptor, the adaptor, and a control method therefor.

BACKGROUND ART

Digital cameras (image sensing devices) have prevailed which can photograph an image by a simple operation, convert the photographed image into digital image data, save the digital image data in a memory, and supply the digital image data to various devices. Digital cameras and printers which can be applied to a direct printing system are also becoming popular. The direct printing system can print by directly transmitting digital image data from a digital camera to the printer in order to use an image photographed by the digital camera as a photograph.

In general, the direct printing function is executed in accordance with specifications set in advance for a camera and printer. In order to make a direct printing-compatible digital camera and printer which have been manufactured and distributed, cope with a new direct printing function, their functions must be updated, which is difficult or often impossible. Direct printing systems having different specifications are not compatible with each other. For example, direct printing by wireless connection and direct printing by USB connection have been defined individually and developed in different ways. As a result, many devices corresponding to only direct printing by USB connection have already been marketed. Under the circumstances, demands have arisen for a direct printing adaptor which can implement direct printing by converting and transmitting different direct printing functions, and connecting devices having different printing specifications.

A print conversion adaptor in a conventional PC environment is called a print server. The print server is designed to, when a printer exists, complement and expand the printer function and share the printer between a plurality of users.

FIG. 31 is a block diagram for explaining a print server system in a conventional PC environment.

The print server system is formed from print servers 2115 and 2116 for controlling printers 2117 and 2119 which can be shared between clients 2111, 2112, and 2113. In this arrangement, when the clients 2111 to 2113 print using the printer 2117, a print process proceeds in the following procedures.

A given client (e.g., 2111) transmits document data via a network 2110 in order to request the print server 2115 to print. The document data is made up of a print command string for describing the print contents of a text, figure, and image on each page of the document. The print command string is also called PDF (Page Description Language). Upon reception of the document data from the client 2111, the print server 2115 temporarily stores the document data in a file called a spool in the print server 2115. Then, the print server 2115 reads out the stored document data, transmits it to the printer 2117, and instructs the printer 2117 to print. The printer 2117 processes the document data and prints it on a paper sheet.

In this manner, the print servers 2115 and 2116 are designed to accurately transmit printer information, via the print servers 2115 and 2116, to the clients (2111 to 2113) which utilize the print servers. The printer information is exchanged by local connection between the printers 2117 and 2119 and the corresponding print servers 2115 and 2116.

Japanese Patent No. 03486553 discloses an example of an adaptor which acquires a print status from a printer and communicates it to a client.

Japanese Patent No. 03573466 discloses a print server for a network system that supports an error notification, re-printing, interrupt instruction, and the like.

Since the print server is designated after the specifications of a corresponding printer are defined, it can support a more advanced function. Japanese Patent Laid-Open No. 11-184649 discloses an example in which a high-end print server functions as an adaptor for a plurality of low-end printers.

Japanese Patent No. 03495845 discloses a print server which registers the functions of a plurality of printers and selects a printer suitable for a print job.

To the contrary, a direct printing adaptor is required to play a role greatly different from that of a print server in the conventional PC environment. More specifically, if a new direct printing protocol is designed to construct a direct printing adaptor, compatibility with many existing products which have already been marketed is not guaranteed. Thus, an existing direct printing protocol must be utilized without any change. Since a plurality of direct printing protocols are greatly different in functions such as transmission of printer information and the like, the printing information and the like may not be accurately transmitted to a digital camera. For example, in direct printing by wireless connection, pure file transfer protocols are often used. These file transfer protocols do not define any transmission of device information and print job information unique to the direct printing.

Even if the above problems are solved, a new problem arises. The new problem will be explained by exemplifying a case where the following method is adopted as a solution to the problem.

An image file is printed by transferring it from a cellular phone with a camera (abbreviate as "cellular phone") that comprises a transmission/reception unit of an infrared ray defined by IrDA (Infrared Data Association). The adaptor uses its infrared transmission/reception unit to receive the image file, and issues to a printer a print job for printing the image file. If transfer of the image file from the cellular phone is normally completed, the adaptor sends a transfer completion response to the cellular phone with the camera.

At this time, for example, when the adaptor issues, to the printer, a print job after the data transfer completion response, the printer may not print immediately because it is busy during printing of data from a PC, or may not print owing to a trouble such as shortage of paper sheets. The user of the cellular phone cannot recognize these problems from the operation result (transfer completion) of the cellular phone.

When the printer is connected to a PC, the PC may issue a print request to the printer while the cellular phone transfers an image. In this case, if the priority of printing by the printer is higher for the PC, printing corresponding to the print request from the PC is preferentially executed. For example, if printing starts in response to a print request from the PC while the user sets an L-size photographic sheet in the printer and transfers image data in order to print an image photographed by the cellular phone on the L-size photographic sheet, a document from the PC is printed on the L-size photographic sheet.

Most low-end printers do not have a liquid crystal screen on their main bodies, and entrust the display function of the print status of direct printing to a connected digital camera. When such a low-end printer is connected to a cellular phone via an adaptor, it is very difficult to transfer the print status of the printer to the cellular phone via the adaptor, and display the print status on the display of the cellular phone. The low-end printer has a poor UI function, and various print settings such as the paper size in printing cannot be achieved by only the printer. When a printer and a cellular phone are connected via an adaptor, the printer may not be able to instruct the adaptor to make the above-described print settings while the cellular phone transfers image data.

When a means for transmitting an image data to a printer from a cellular phone or digital camera serving as an image data source uses a low-speed interface such as IrDA, the printer is occupied by the data supply source during transfer of image data via the interface, greatly decreasing the availability of the printer.

After printing starts on the basis of image data from an image data source, ink or print sheets of the printer may run short during printer or printing may not be completed due to any error. Even in this case, however, connection between the image data source and the printer normally ends upon the completion of transferring image data from the image data source. The printer cannot notify the image data source that printing is not completed. This problem is revealed when direct printing is executed not by connecting a printer serving as a server and an image data source serving as a client by common protocols, but by absorbing the difference between their protocols by an intervening adaptor.

A long time may be taken for printing depending on the printer, in addition to a long time taken to transfer image data from a client to the printer. When the client is a battery-driven mobile device, the remaining battery amount of the client may run short before the completion of printing, or in the worst case, printing may not be completed. If the battery is not exhausted until the remaining battery amount runs short, but a long time is taken for direct printing, a subsequent operation of the mobile device cannot be guaranteed, posing a problem.

If image data is transferred from a client to an adaptor, but the adaptor cannot receive data from a printer because, for example, the printer is connected to a PC and prints data from the PC, data transfer from the adaptor to the printer must wait for a long time. Also in this case, the client must wait without receiving any data transfer completion notification. The battery is disadvantageously wasted when the client is a battery-driven mobile device.

Conventionally, the user cannot designate which of the completion of printing by a printer and release of a cellular phone upon the completion of data transfer from the cellular phone is given priority. No process proper to the priority order by the user is performed.

DISCLOSURE OF INVENTION

It is an object of the present invention to solve the conventional problems.

A feature of the present invention is to provide a printing system which prints by interposing an adaptor between an image supply device and a printer and can increase the availabilities of the image supply device and printer, the adaptor, and a control method therefor.

According to the present invention, there is provided with a printing system which prints by outputting, to a printer via an adaptor, image data held by an image supply device, comprising:

the adaptor having, a first interface configured to communicate with the printer by a first communication protocol, and a second interface configured to communicate with the image supply device by a second communication protocol different from the first communication protocol, and the printing system comprising:

a first operation mode in which image data from the image supply device is received by the second interface, and before completion of receiving the image data by the second interface, a print job is issued to the printer via the first interface, a second operation mode in which image data from the image supply device is received by the second interface, and after completion of receiving the image data by the second interface, a print job is issued to the printer via the first interface, selection means for selecting either of the first operation mode and the second operation mode, and switching means for switching between the first operation mode and the second operation mode in accordance with a selection result of the selection means.

Further, according to the present invention, there is provided with an image supply device for outputting image data to a printer via an adaptor, comprising:

an interface configured to communicate with the adaptor; and selection means for selecting either of a first operation mode in which a print job is issued from the adaptor to the printer before completion of transmitting image data to the adaptor via the interface, and a second operation mode in which a print job is issued to the printer via the interface after completion of transmitting image data to the adaptor via the interface.

Further, according to the present invention, there is provided with an adaptor for mediating image data held by an image supply device to output the image data to a printer, and causing the printer to print, comprising:

a first interface configured to communicate with the printer by a first communication protocol;

a second interface configured to communicate with the image supply device by a second communication protocol different from the first communication protocol;

selection means for selecting either of a first operation mode in which image data from the image supply device is received by the second interface, and before completion of receiving the image data via the second interface, a print job is issued to the printer via the first interface, and a second operation mode in which image data from the image supply device is received by the second interface, and after completion of receiving the image data via the second interface, a print job is issued to the printer via the first interface; and switching means for switching between the first operation mode and the second operation mode in accordance with a selection result by the selection means.

Other features, objects and advantages of the present invention will be apparent from the following description when taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 15 depicts a view showing the flow of an initialization process in direct printing using USB in 1401 of FIG. 14;

FIGS. 17A and 17B depict views showing an example of a Capability acquisition script in direct printing by USB according to the embodiment;

FIGS. 18A to 18C depict views showing an example of a job issuing script in direct printing by USB according to the embodiment;

FIGS. 19A and 19B depict views showing an example of a Status notification script in direct printing by USB according to the embodiment;

FIG. 20 depicts a view for explaining the flow of a process in initialization and file transfer when the adaptor and cellular phone communicate with each other via an infrared interface according to the embodiment;

BEST MODE FOR CARRYING OUT THE INVENTION

Preferred embodiments of the present invention will now be described in detail in accordance with the accompanying drawings. Note that the following embodiments do not limit inventions according to the scope of claims of the present invention. Not all combinations of features described in the embodiments are indispensable to solutions of the present invention.

Figure 1:
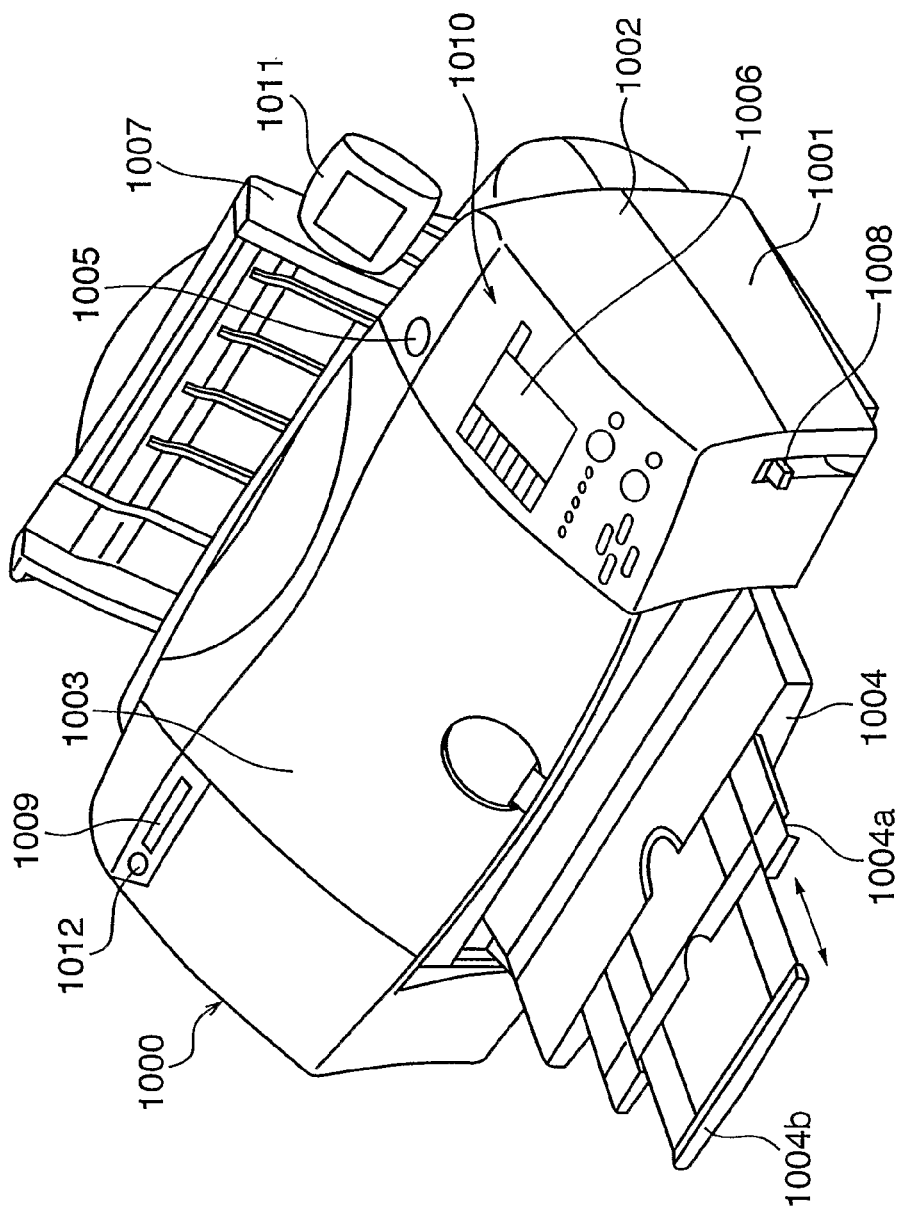
FIG. 1 depicts a schematic perspective view of a photo-direct printer according to an embodiment of the present invention.

FIG. 1 depicts a schematic perspective view of a photo-direct printer (hereinbelow, PD printer) 1000 according to an embodiment of the present invention. The PD printer 1000 has a general PC printer function for receiving data from a host computer (PC) and printing the data, and a function for directly reading image data stored in a storage medium such as a memory card or receiving image data from a digital camera, PDA, or the like and printing the image data.

In FIG. 1, the main body as the outer shell of the PD printer 1000 has a lower case 1001, upper case 1002, access cover 1003, and discharge tray 1004 as exterior members. The lower case 1001 forms an approximate lower half part of the PD printer 1000, and the upper case 1002 forms an approximate upper half part of the main body. The combination of the two cases produces a hollow structure having an accommodation space for respective mechanisms (to be described later). The structure has openings in its upper surface and front surface. Further, the discharge tray 1004 is rotatably held at its one end in the lower case 1001. The rotation of the discharge tray 1004 opens/closes the opening in the front surface of the lower case 1001. When print operation is executed, the discharge tray 1004 is rotated to the front surface side to open the opening, thereby printed sheets (including plain paper, dedicated paper, resin sheet, and the like; to be simply referred to as a print sheet hereinafter) can be discharged from the opening, and the discharged print sheets can be sequentially stacked. The discharge tray 1004 includes two auxiliary trays 1004*a* and 1004*b*. The print sheet support area of the discharge tray 1004 can be expanded or reduced in three steps by pulling out the respective trays in accordance with necessity.

The access cover 1003, rotatably held at its one end by the upper case 1002, can open/close the opening formed in the upper surface. When a printhead cartridge (not shown), an ink tank (not shown), or the like accommodated in the main body is exchanged, the access cover 1003 is opened. Note that although not particularly shown, when the access cover 1003 is opened/closed, a projection formed on the rear surface of the access cover 1003 rotates a cover opening/closing lever. The open/close status of the access cover 1003 can be detected by detecting the rotation position of the lever with a microswitch or the like.

A power key 1005 is provided on the upper surface of the upper case 1002. Further, an operation panel 1010 having a liquid crystal display 1006, various key switches, and the like is provided on the right side of the upper case 1002. The structure of the operation panel 1010 will be described in detail with reference to FIG. 2. Reference numeral 1007 denotes an automatic feeder which automatically feeds print sheets into the apparatus main body. Reference numeral 1008 denotes a sheet interval selection lever to control the interval between a printhead and a print sheet. Reference numeral 1009 denotes a card slot into which an adaptor, to which a memory card is attachable, is inserted. Image data stored in the memory card is directly read via the adaptor and printed. As the memory card (PC), compact flash® memory, smart media, memory stick, and the like are available. Reference numeral 1011 denotes a viewer (liquid crystal display) attachable/removable to/from the main body of the PD printer 1000. In a case where the PC card is searched for an image to be printed, images are displayed by one frame or index images are displayed on the viewer. Reference numeral 1012 denotes a USB terminal which connects a digital camera (to be described later), and can connect an adaptor 1200 according to the present invention. Further, a USB connector for connecting a personal computer (PC) is provided on the rear surface of the PD apparatus 1000.

Figure 2:
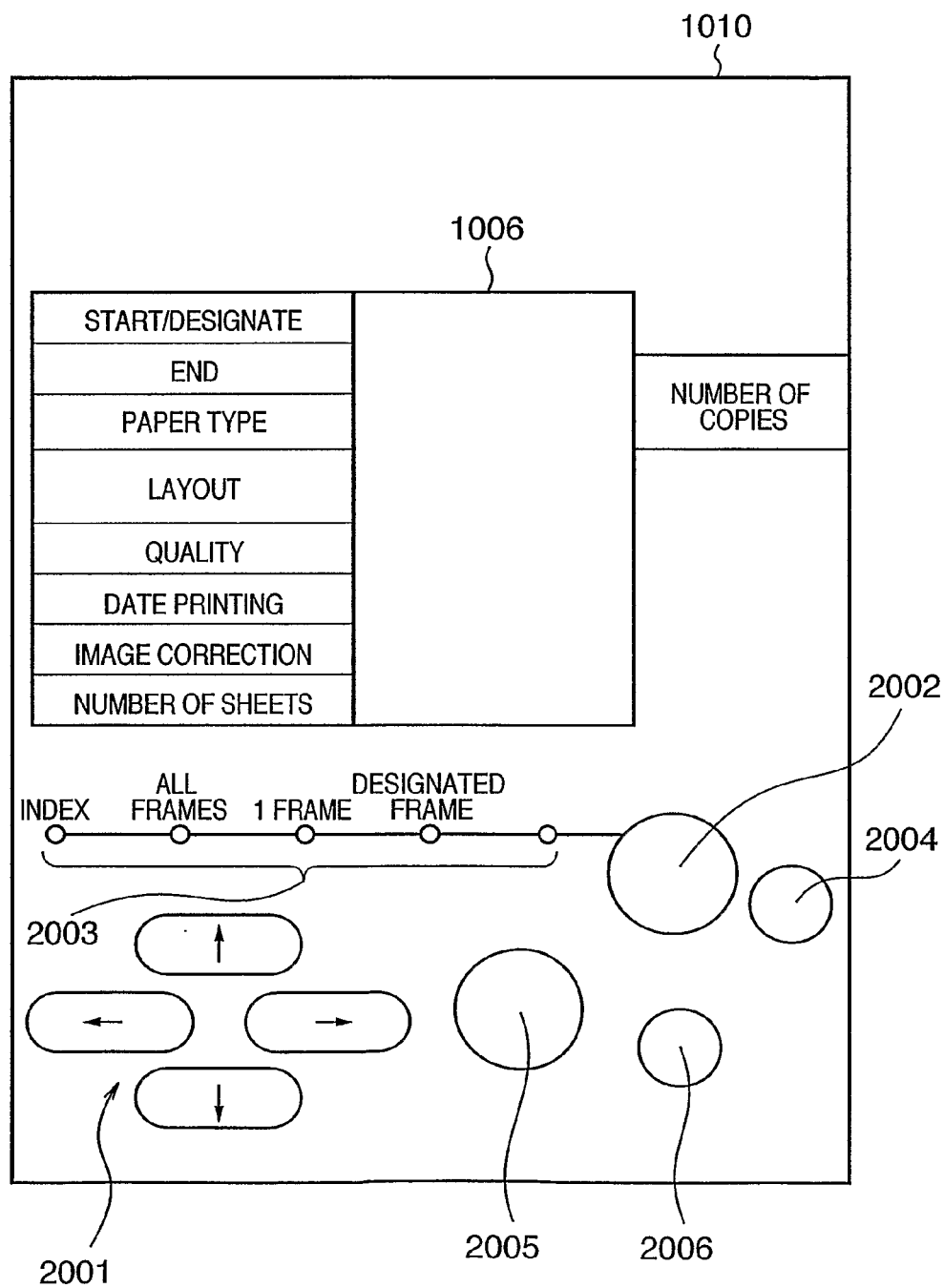
FIG. 2 depicts a schematic view of the control panel of the PD printer according to the embodiment.

FIG. 2 depicts a schematic view of the control panel 1010 of the PD printer 1000 according to the embodiment.

In FIG. 2, the liquid crystal display 1006 displays menu items for various settings of data regarding items printed on the left and right sides. The displayed items include, e.g., a head picture number of plural image files to be printed, a designated frame number (start frame designation/print frame designation), a last picture number to be printed (end), the number of printouts (copies), the type of paper sheet used in printing (paper type), the number of pictures printed on one paper sheet (layout), designation of printing quality (quality), designation as to whether or not to print a photographing date (date printing), designation as to whether or not to make picture correction before printing (image correction), display of the number of paper sheets necessary for printing (number of paper sheets), and the like. The respective items are selected or designated with a cursor key 2001. Reference numeral 2002 denotes a mode key. The type of printing (index printing, all frame printing, one frame printing, and the like) can be changed every time the mode key 2002 is pressed, and a corresponding LED of the LED 2003 is turned on. Reference numeral 2004 denotes a maintenance key for performing printer maintenance such as cleaning of the printhead. Reference numeral 2005 denotes a print start key which is pressed to designate the start of printing or establish maintenance setting. Reference numeral 2006 denotes a print stop key which is pressed to stop printing or designate to stop maintenance.

Figure 3:
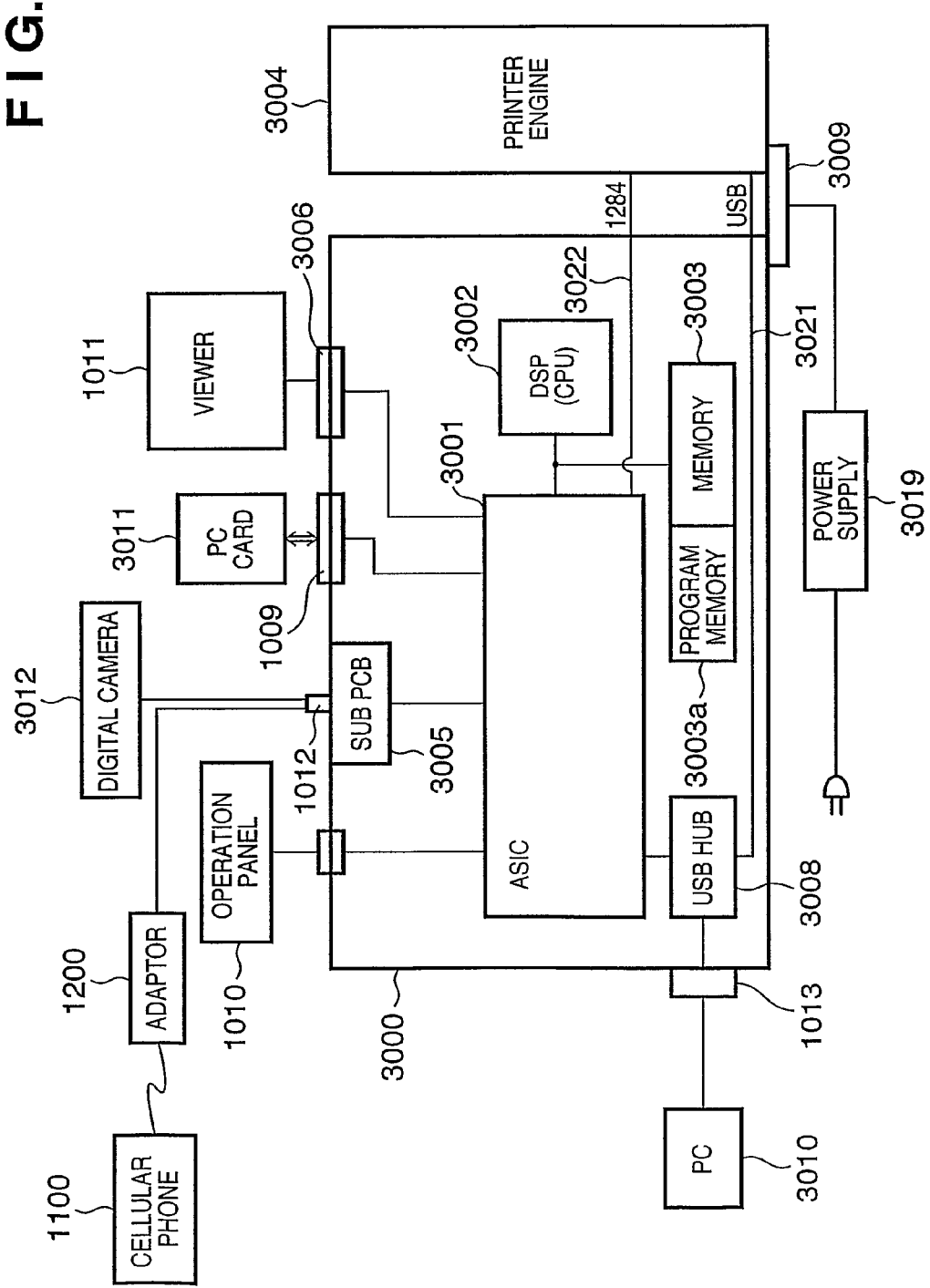
FIG. 3 is a block diagram showing the arrangement of a main part concerning control of the PD printer according to the embodiment of the present invention.

Next, the arrangement of a main part concerning control of the PD printer 1000 according to the embodiment of the present invention will be explained with reference to FIG. 3. In FIG. 3, the same reference numerals as those in the above-described drawings denote the same parts, and a description thereof will be omitted.

In FIG. 3, reference numeral 3000 denotes a controller (control board). Reference numeral 3001 denotes an ASIC (application specific LSI). Reference numeral 3002 denotes a DSP (Digital Signal Processor) which incorporates a CPU and performs various control processes (to be described later) and image processes such as conversion from luminance signals (RGB) to density signals (CMYK), scaling, gamma conversion, and error diffusion. Reference numeral 3003 denotes a memory having a program memory 3003*a* for storing a control program for the CPU of the DSP 3002, a RAM area for storing programs in execution, and a memory area functioning as a work memory for storing image data and the like. Reference numeral 3004 denotes a printer engine which is an inkjet print type printer engine for printing a color image by using a plurality of color inks. Reference numeral 3005 denotes a USB connector serving as a port for connecting a digital camera (DSC) 3012. The USB connector 3005 can also connect the adaptor 1200 (to be described later). The PC printer 1000 can be connected via the adaptor 1200 to a cellular phone 1100 with a camera and infrared interface, and receive image data from the cellular phone 1100 to directly print it. This process will be described in detail later.

Reference numeral 3006 denotes a connector for connecting the viewer 1011. Reference numeral 1013 denotes a USB connector serving as a port for connecting a PC 3010. Reference numeral 3008 denotes a USB hub which transmits data from the PC 3010 to the printer engine 3004 via a USB 3021 when the PD printer 1000 performs printing based on image data from the PC 3010. Thus, the connected PC 3010 can directly exchange data and signals with the printer engine 3004 and execute printing (functions as a general PC printer). Reference numeral 3009 denotes an electric power connector which receives a DC voltage converted from a commercial AC voltage from an electric power supply 3019. The PC 3010 is a general personal computer. Reference numeral 3011 denotes memory card (PC card) as described above; and 3012, a digital camera (DSC: Digital Still Camera).

Note that signals are exchanged between the controller 3000 and the printer engine 3004 via the above-described USB 3021.

<Description of Cellular Phone with Camera>

Figure 4A:
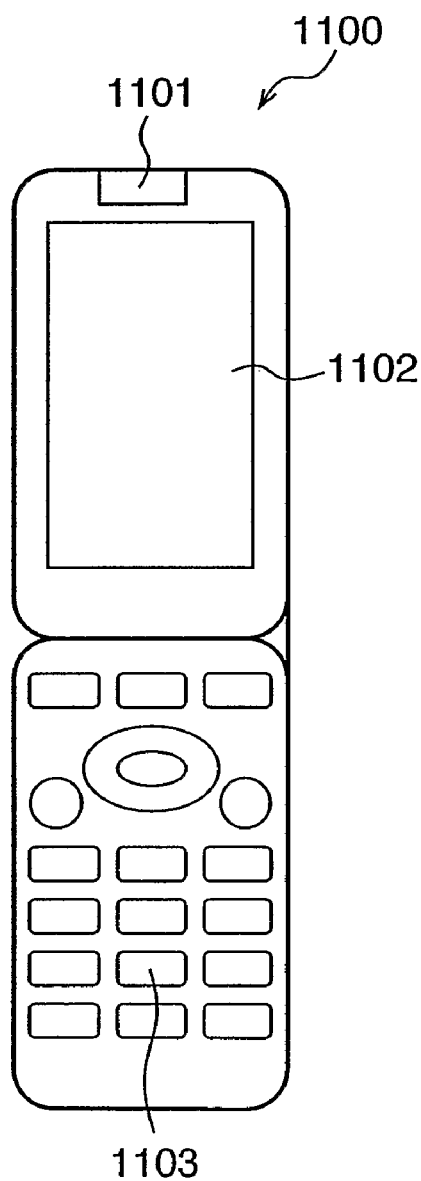
FIGS. 4A and 4B depict views of the outer appearance of a cellular phone with a camera that can perform direct printing by supplying image data to the PD printer via an adaptor according to the embodiment of the present invention.
Figure 4B:
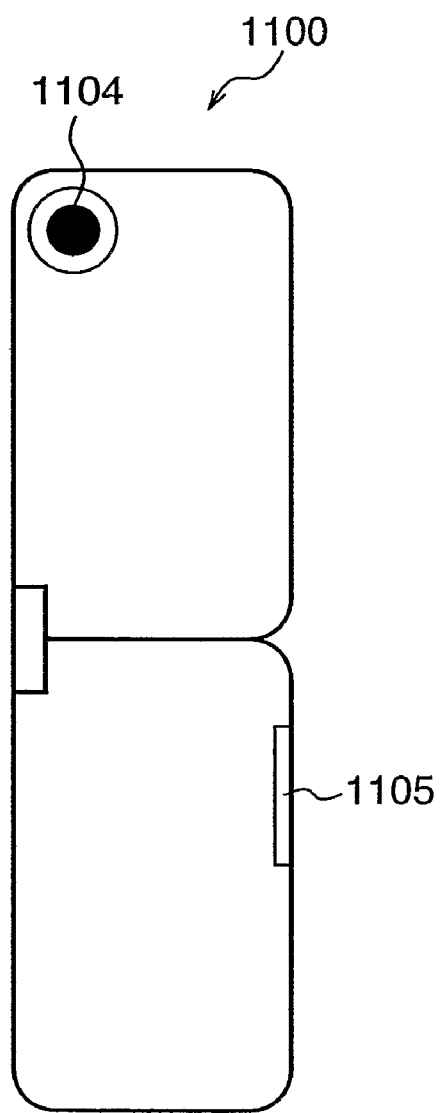

FIGS. 4A and 4B depict views of the outer appearance of the cellular phone 1100 with the camera (to be referred to as "cellular phone" hereinafter) that can perform direct printing by supplying image data to the PD printer 1000 via the adaptor 1200 according to the embodiment of the present invention. FIG. 4A shows a state in which the cellular phone is opened to show the operation screen, and FIG. 4B shows the rear surface.

A transmission/reception unit (IrDA) 1101 of an infrared ray transmits/receives infrared rays for the purpose of infrared communication. The infrared transmission/reception unit 1101 can also transmit/receive infrared rays with another cellular phone 1100, and transmit infrared rays to an electronic device (e.g., a TV set) having a remote-control light-receiving unit. A liquid crystal display 1102 displays various kinds of information when the cellular phone 1100 is used as a cellular phone. When the cellular phone 1100 is used as a camera, the liquid crystal display 1102 can also function as a viewfinder to display an image and also display a photographed image and the like. Buttons 1103 are used to create a mail document, in addition to dial operation when the cellular phone 1100 is used as a cellular phone. When the cellular phone 1100 is used as a camera, at least one of the buttons 1103 can function as a shutter or the like to perform camera operation. Note that the functions of the buttons 1103 change in accordance with the specifications of the cellular phone 1100. A lens 1104 has the lens function of a general camera. By capturing an object through the lens 1104 and operating the buttons 1103, optical zoom operation, focus adjustment, and photographing can be achieved. A card slot 1105 is a memory card slot for connecting a memory card. By using the memory card, a sensed image can be saved and referred to, and various kinds of information in the cellular phone 1100 can be saved and referred to.

Figure 5:
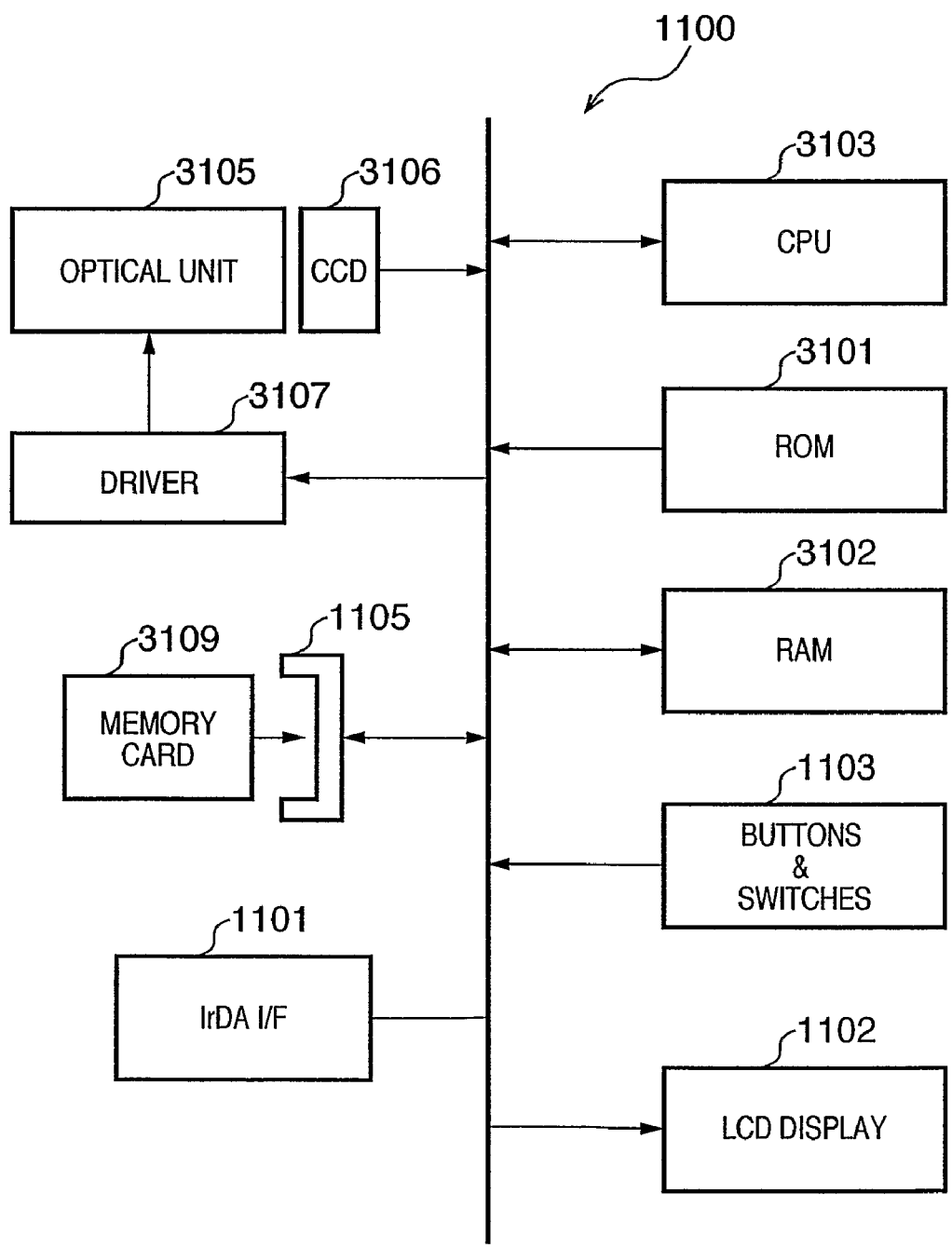
FIG. 5 is a block diagram for explaining the arrangement of a main part concerning control of the cellular phone with the camera according to the embodiment of the present invention.

FIG. 5 is a block diagram for explaining the arrangement of a main part concerning control of the cellular phone 1100 according to the embodiment of the present invention. In FIG. 5, the same reference numerals as those in the above-described drawings denote the same parts, and a description thereof will be omitted.

A CPU 3103 controls the overall cellular phone 1100. A ROM 3101 stores various data and programs for executing process procedures by the CPU 3103. Assuming that a program is properly updated, the ROM 3101 may be formed from a writable nonvolatile memory (e.g., flash memory). A RAM 3102 is used as a work area in executing a process by the CPU 3103, and temporarily saves various data. The RAM 3102 may be formed from a general volatile memory, or a nonvolatile memory which holds its contents even upon power-off. A CCD device 3106 generates an electrical signal corresponding to an image formed on the device surface of the CCD device 3106 via an optical unit 3105. A driver 3107 controls the focusing, F-number, and the like of the optical unit 3105 under the control of the CPU 3103. A memory card 3109 is generally a compact flash® memory card, smart medium, or the like, and stores image data of a photographed image and the like.

<Description of Adaptor>

Figure 6A:
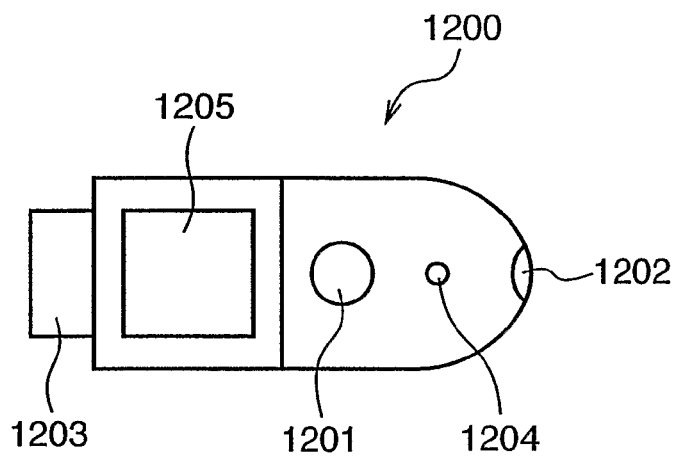
FIGS. 6A and 6B depict views of the outer appearance of the adaptor according to the embodiment of the present invention.
Figure 6B:
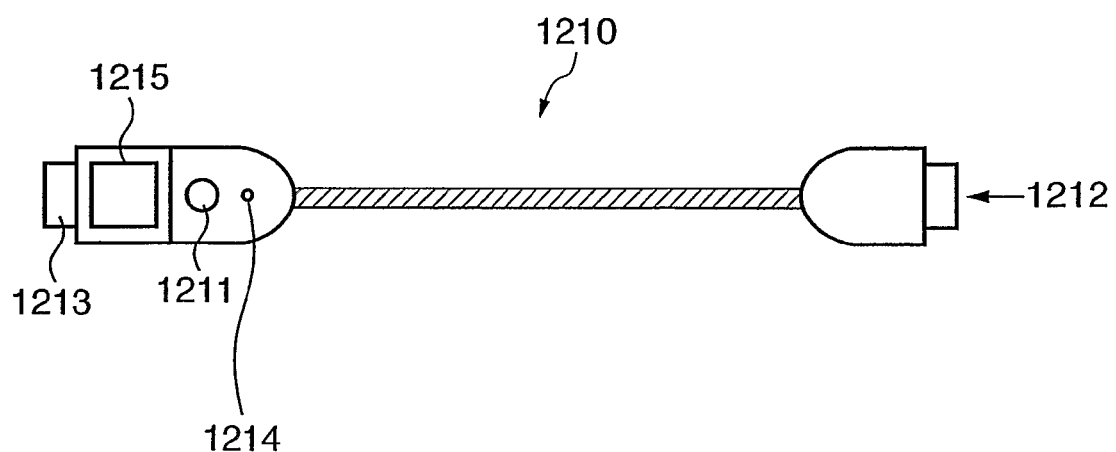

FIGS. 6A and 6B depict views of the outer appearance of the adaptor 1200 according to the embodiment of the present invention.

In FIG. 6A, a print resume button 1201 designates resume of printing when printing interrupts. The print resume button 1201 may be given another function while no print job is executed. For example, the print resume button 1201 may be given a function for selecting the paper size of a print sheet (print paper) in printing. Alternatively, buttons may be arranged separately for selection of the paper size and resume of printing. Buttons may be prepared separately for various settings concerning the layout, the number of print sheets, date setting, and another print result in addition to the paper size. A transmission/reception unit 1202 of an infrared ray is used for infrared wireless communication, and in the embodiment, used to exchange data with the infrared interface 1101 of the cellular phone 1100. A USB terminal 1203 is used to connect the direct printing USB connector 3005 of the PD printer 1000. A state display LED (indicator) 1204 displays the state of the adaptor 1200, and can notify the user of the state of the adaptor 1200 by switching the emission color, light-on, and flickering pattern in accordance with the print queue state, print acceptance state, image transfer state, active print state, print error state, transfer error state, and the like. The LED 1204 may function as various UIs in addition to the UI for displaying the state of the adaptor 1200. For example, a plurality of LEDs may display paper sizes in correspondence with respective paper sizes. In this case, character strings (A4, postcard, card, or the like) representing paper sizes may be printed above respective LEDs. Every time the button 1201 is pressed, the display of the LED may be switched to select a paper size used for printing accordingly. LEDs may be prepared separately to display various setting results associated with, e.g., the layout, the number of printed sheets, date setting, and another print settings in addition to the paper size. In order to preferably display a numerical value, a 7-segment LED or LCD may be used. Note that the above-mentioned character string representing a paper size may be directly printed on the housing of the adaptor 1200, as described above, or displayed by putting a sticker. In this case, stickers bearing paper sizes suitable for the printing culture of each country in the world (for example, A4, L size, and postcard for Japan, and Letter, 4×6, and card for US) are prepared. The ROM 3101 of the adaptor 1200 is replaced to cope with these sizes. The housing of the adaptor 1200 can be utilized suitably in countries of the world by replacing the sticker while commonly using the housing. A logotype sticker 1205 represents that the adaptor 1200 complies with a direct printing standard. The logotype sticker 1205 allows the user to recognize that the USB terminal 1203 can be connected to a PD printer applicable to direct printing. Instead of putting the logotype sticker 1205, a logotype may be directly printed or inscribed on the housing of the adaptor 1200. FIG. 6A illustrates an adaptor having UIs such as an LED and buttons, but an adaptor having no UI is also conceivable. At this time, a logotype sticker can be effectively put.

FIG. 6B depicts a view of another outer appearance of the adaptor 1200 according to the embodiment when the adaptor is implemented using USB communication (to be described later) in place of the above-described infrared communication.

A description of components 1211 and 1213 to 1215 in FIG. 6A is the same as that of the components 1201 and 1203 to 1205 in FIG. 6A. Reference numeral 1212 denotes a USB terminal for USB communication with an image supply device such as a DSC (Digital Still Camera). The PD printer 1000 and image supply device are connected by a cable, and an adaptor 1210 has the form of a cable in appearance in consideration of layout convenience. At this time, both the USB terminals 1212 and 1213 of the adaptor have the form of a USB-A connector, and the user may mistake the connection direction of the adaptor. To prevent this, the logotype sticker 1215 is put, or a logotype is printed or inscribed on the adaptor near the USB terminal 1203 which is to be connected to a PD printer. This setting can prevent any mistake of the adaptor connection, in addition to the above-described effects.

The arrangement of a main part concerning control of the adaptor 1200 according to the embodiment of the present invention will be explained with reference to FIG. 7.

Figure 7:
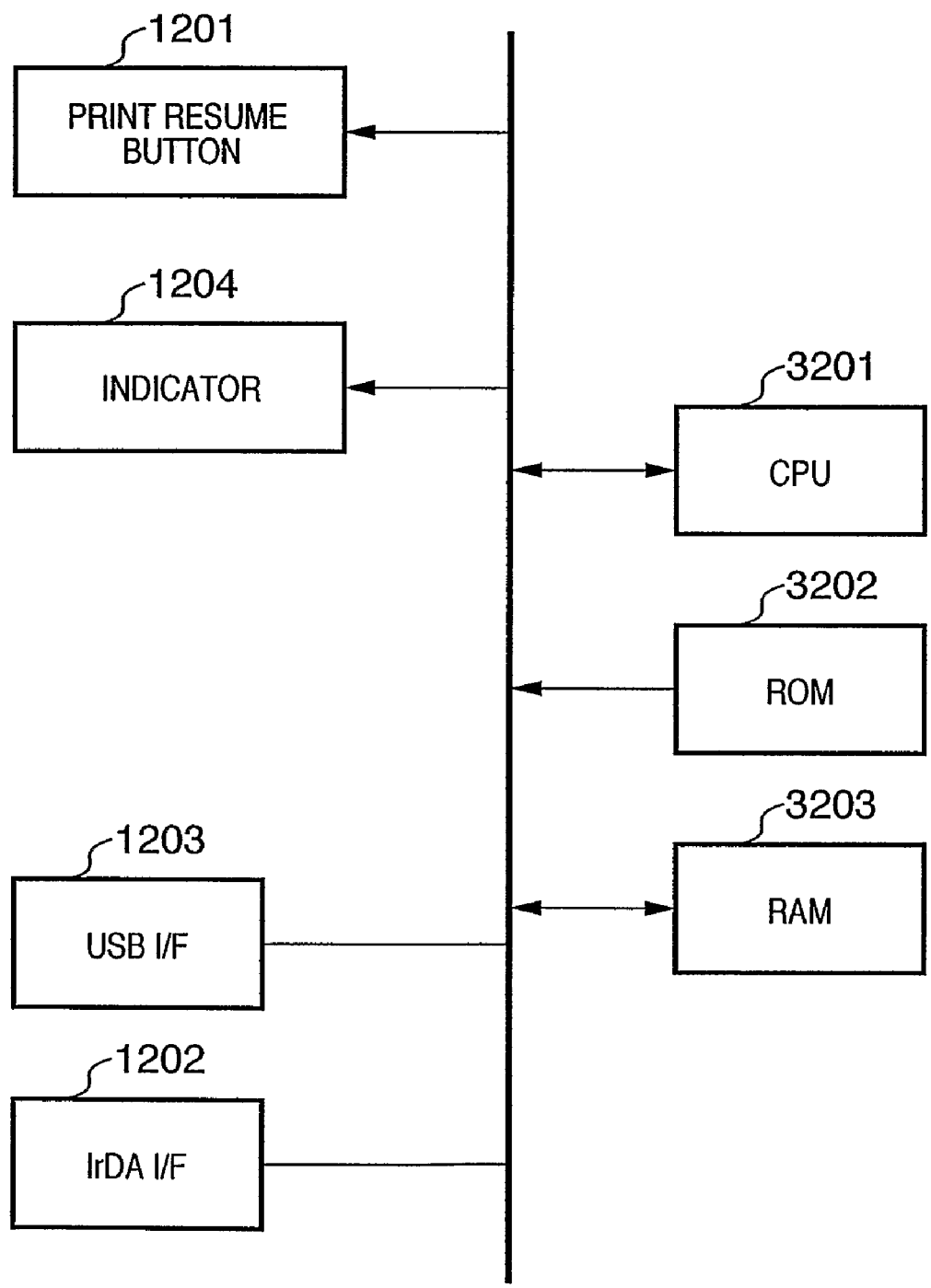
FIG. 7 is a block diagram for explaining the hardware arrangement of the adaptor according to the embodiment.

FIG. 7 is a block diagram for explaining the hardware arrangement of the adaptor 1200 according to the embodiment. In FIG. 7, the same reference numerals as those in the above-described drawings denote the same parts, and a description thereof will be omitted.

A CPU 3201 executes various control processes (to be described later) in accordance with programs stored in a ROM 3202. The ROM 3202 stores various data and programs which are executed by the CPU 3201. Assuming that a program stored in the ROM 3202 is properly updated, the ROM 3202 may be formed from a writable nonvolatile memory (e.g., flash memory). A RAM 3203 is used as a work area for the CPU 3201, and temporarily saves various data in a control process by the CPU 3201. The RAM 3203 may be formed from a volatile memory whose contents are erased upon power-off, or a writable nonvolatile memory (e.g., flash memory), similar to the ROM 3202. Memories of these types may be adopted to use a different RAM in accordance with the application purpose. For example, only an area for holding a print image file is assigned to a nonvolatile memory. Even after the adaptor 1200 is turned off, an image file can be held nonvolatile in the adaptor 1200. When the adaptor 1200 is turned on again, the image can be printed again.

Figure 8:
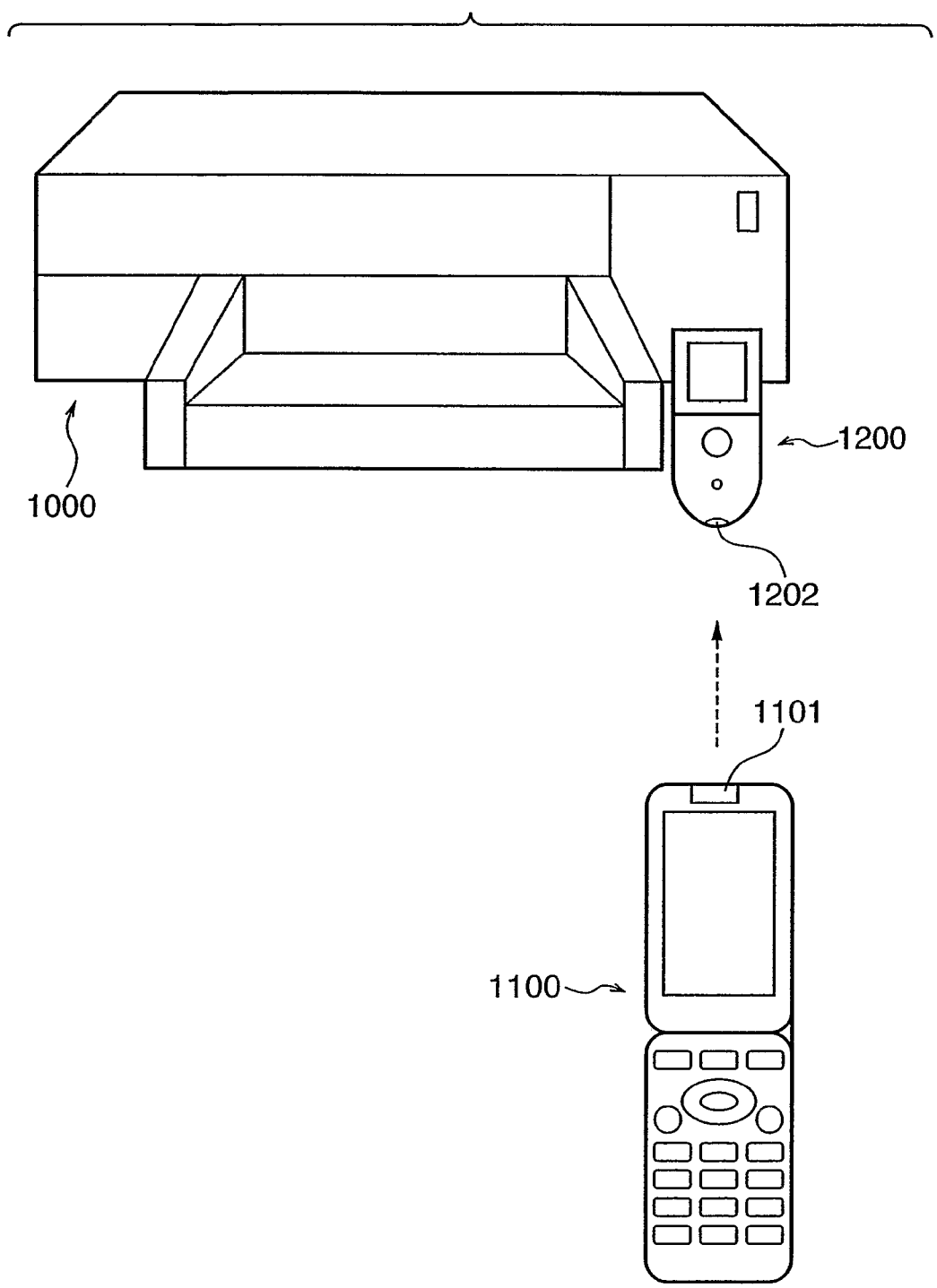
FIG. 8 depicts a view for explaining a state in which the adaptor according to the embodiment of the present invention is connected to the PD printer and the infrared transmission/reception unit of the cellular phone with the camera is directed to the infrared transmission/reception unit of the adaptor.

FIG. 8 depicts a view for explaining a state in which the adaptor 1200 according to the embodiment of the present invention is connected to the PD printer 1000 and the infrared transmission/reception unit 1101 of the cellular phone 1100 is directed to the infrared transmission/reception unit 1202 of the adaptor 1200. By connection as shown in FIG. 8, direct printing can be executed by transmitting image data from the cellular phone 1100 to the PD printer 1000 via the adaptor 1200 according to the embodiment.

<Description of Communication Protocol Stack of Direct Printing Adaptor>

Figure 9:
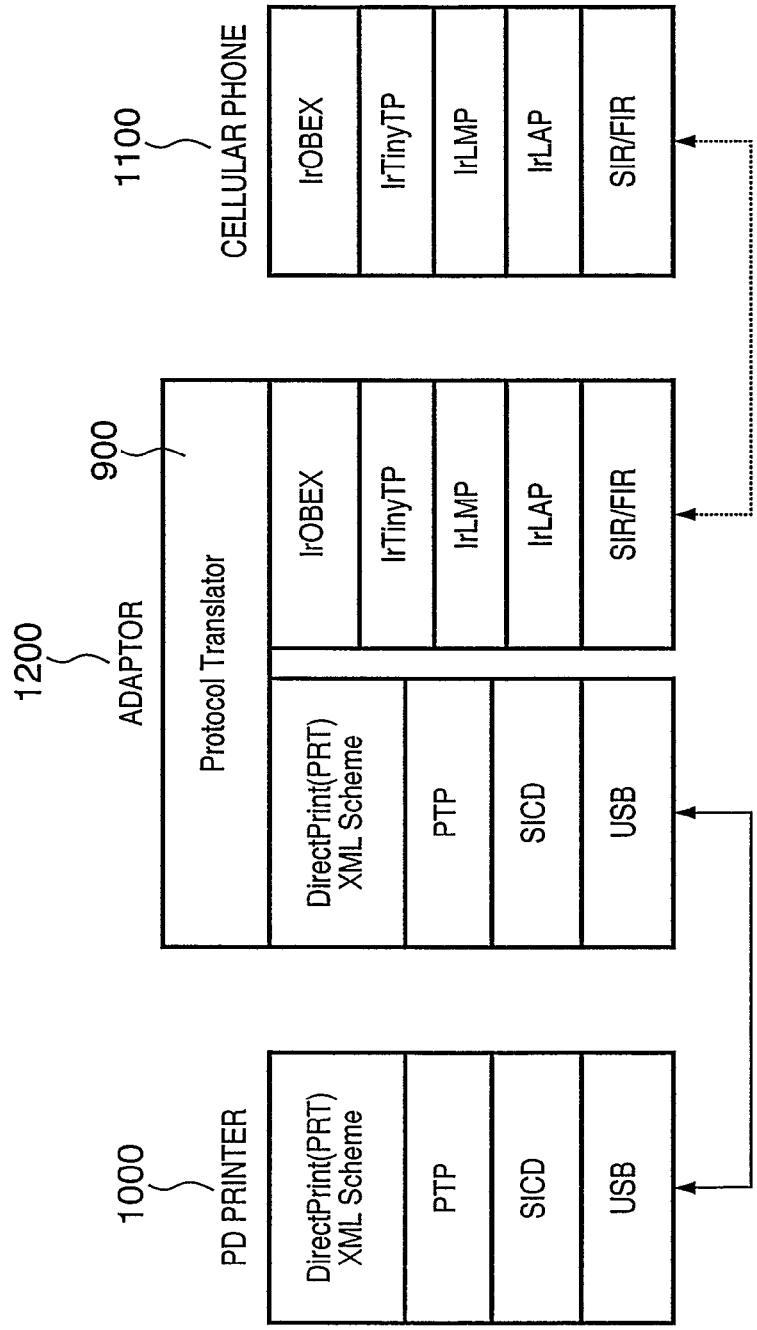
FIG. 9 depicts a view showing the structures of the communication protocol stacks of the PD printer, the adaptor, and the cellular phone with the camera according to the embodiment of the present invention.

FIG. 9 depicts a view for explaining an outline of protocol stacks which are respectively constructed by the PD printer 1000, the adaptor 1200, and the cellular phone 1100 with the camera when the adaptor 1200 according to the embodiment is connected to the PD printer 1000, as shown in FIG. 8, and image data is supplied from the cellular phone 1100.

The PD printer 1000 is a USB host as a physical interface, and acts as a USB host of SICD (Still Image Capture Device) class defined as a USB standard. Transport control is implemented by PTP (Picture Transfer Protocol (PIMA15740)) using SICD. A direct printing application in the PD printer 1000 exchanges information for printing with the image supply device by using PTP, and the PD printer 1000 functions as a direct printing-compatible printer.

The cellular phone 1100 also functions as an infrared communication terminal device using an IrDA (Infrared Data Association) SIR device or FIR device as a physical interface. As host protocols, the cellular phone 1100 uses IrLAP (Link Access Protocol) for link access and IrLMP (Link Management Protocol) for link management. Transport control is implemented by IrTinyTP (Tiny Transport Protocol) using IrLMP. A data transfer application in the cellular phone 1100 transfers data by using IrOBEX (Object Exchange Protocol) above IrTinyTP, and the cellular phone 1100 functions as an infrared data communication terminal. Note that another protocol structure can also implement an infrared data communication terminal. For example, the data transfer application can also be implemented by image transfer using IrTran-P (Transfer Picture) or data transfer using IrCOMM serial/parallel port emulation.

The adaptor 1200 according to the embodiment comprises both protocol stacks corresponding to the PD printer 1000 and cellular phone 1100, and uses a protocol translator 900 to translate communication protocols between the PD printer 1000 and the cellular phone 1100. For example, the adaptor 1200 receives image data transmitted from the cellular phone 1100 by infrared rays, and uses the received image data to generate direct printing information by the protocol translator 900. The adaptor 1200 transmits the generated printing information to the PD printer 1000 to issue a direct printing job.

FIG. 9 illustrates the cellular phone 1100 having an IrDA terminal as a data source of image data. In addition to the cellular phone 1100, the embodiment can also be applied to a cellular phone without any camera, a PHS, a PDA, a digital still camera, or another terminal as far as the terminal comprises an IrDA terminal and can transfer image information.

A communication means having an image data source to transfer image data may be a means other than IrDA, and may be a wireless communication means such as BlueTooth or 802.11x, or a wired communication means such as USB, IEEE1394, or Ethernet.

Figure 10:
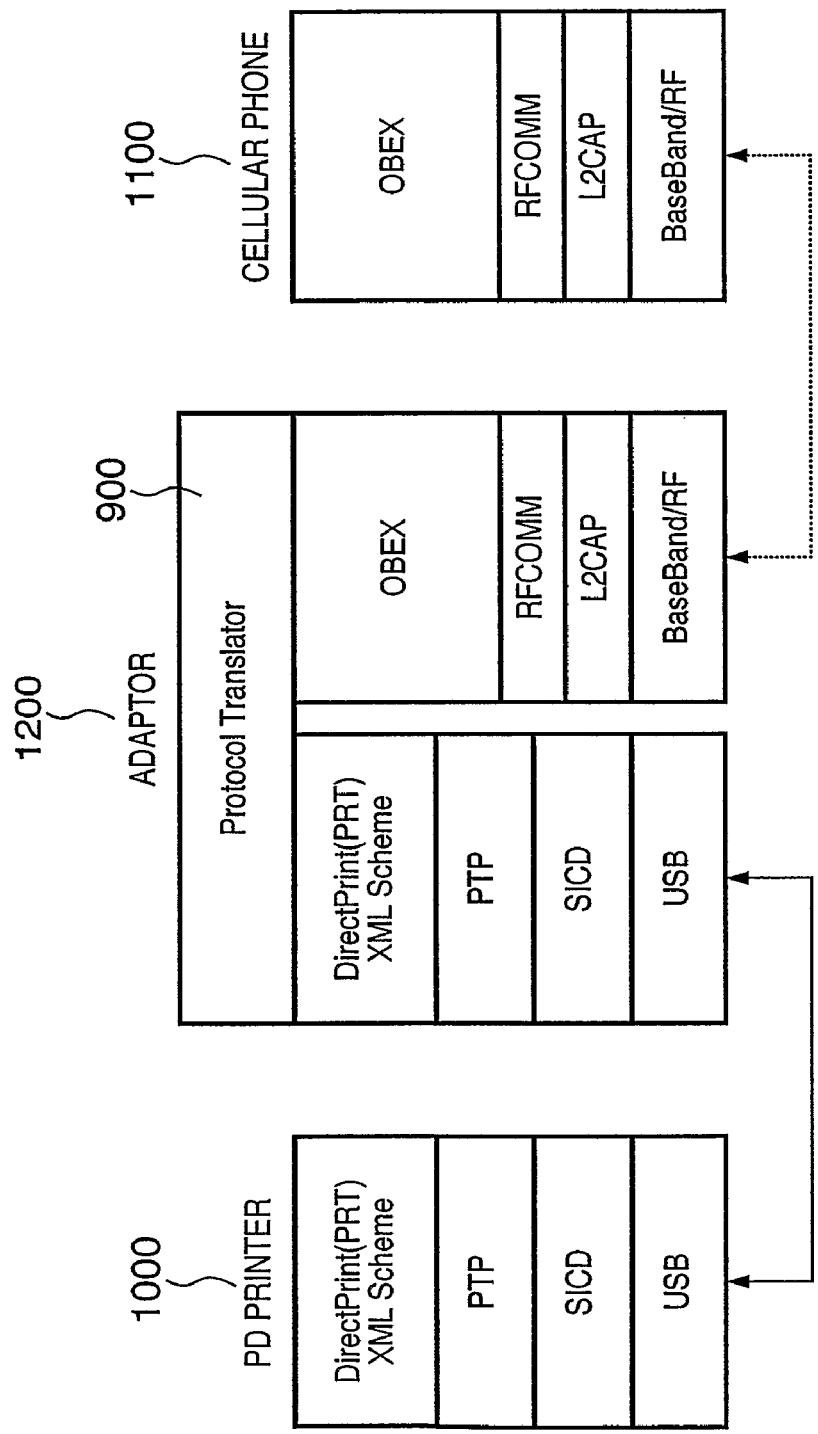
FIG. 10 depicts a view showing the structures of the communication protocol stacks of the PD printer, the adaptor, and a cellular phone with a Bluetooth device and camera according to the embodiment of the present invention.

FIG. 10 depicts a view showing an example of the structure of a protocol stack when the adaptor 1200 and cellular phone 1100 communicate with each other by Bluetooth. OBEX (Object Exchange Protocol) may be OPP, BIP, or BPP.

Figure 11:
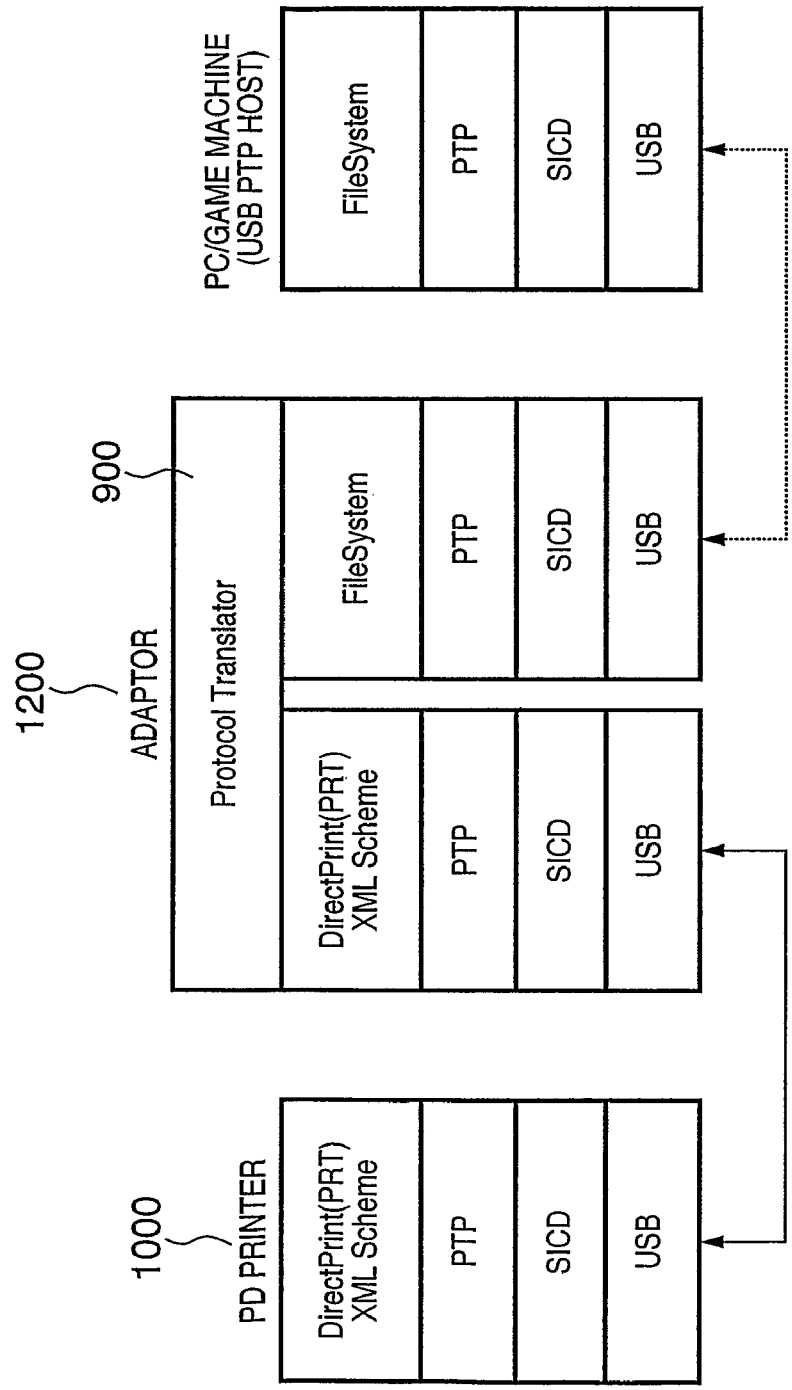
FIG. 11 depicts a view showing the structures of the communication protocol stacks of the PD printer, the adaptor, and a PC with a USB host terminal according to the embodiment of the present invention.

FIG. 11 depicts a view showing an example of the structure of a protocol stack when the adaptor 1200 and a PC or game machine are USB-connected. The file system (FileSystem) may be MSC.

Figure 12:
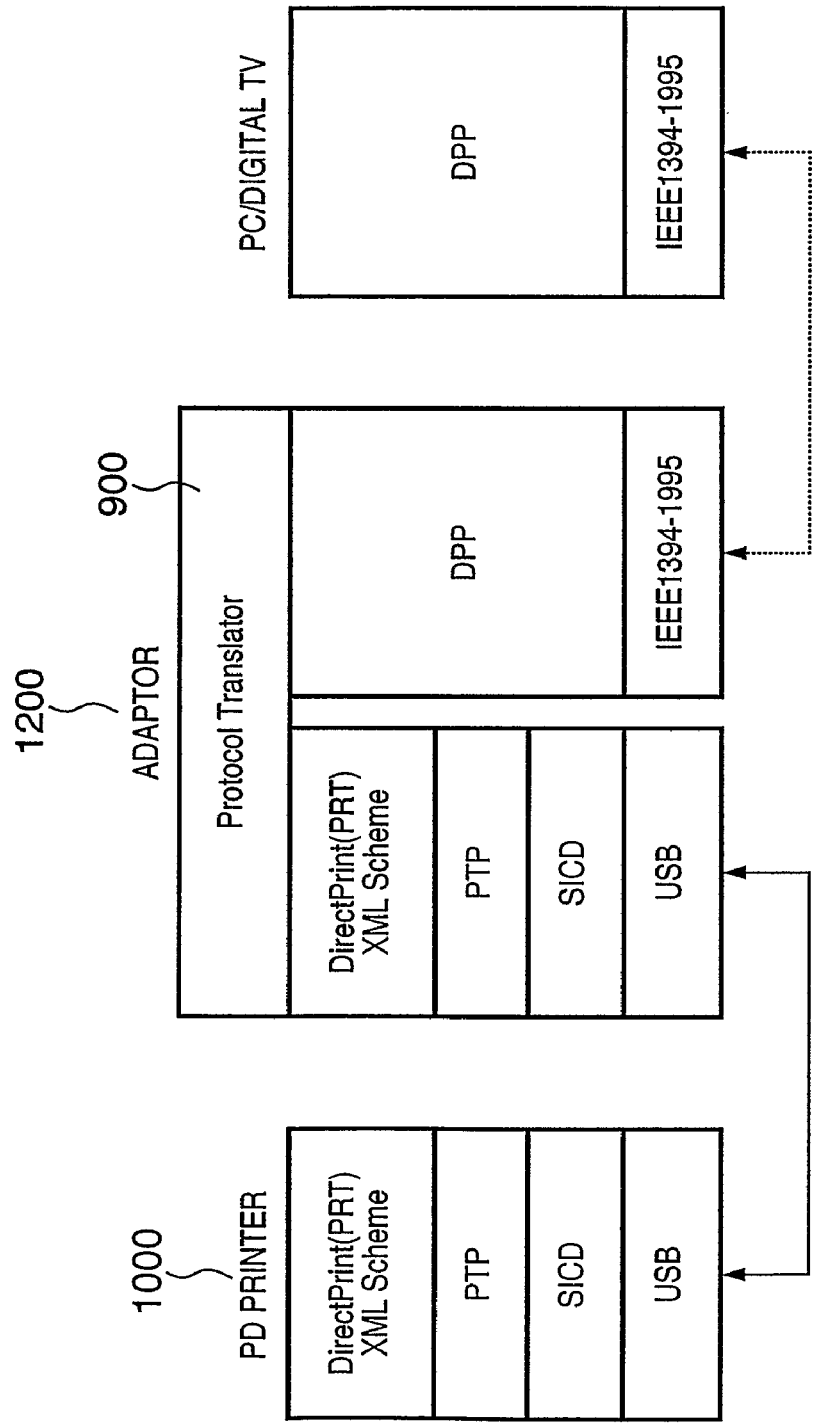
FIG. 12 depicts a view showing the structures of the communication protocol stacks of the PD printer, the adaptor, and a PC with an IEEE1394-1995 terminal according to the embodiment of the present invention.

FIG. 12 depicts a view showing an example of the structure of a protocol stack when the adaptor 1200 and a PC or digital television set use IEEE1394. DPP may be SBP-2.

Figure 13:
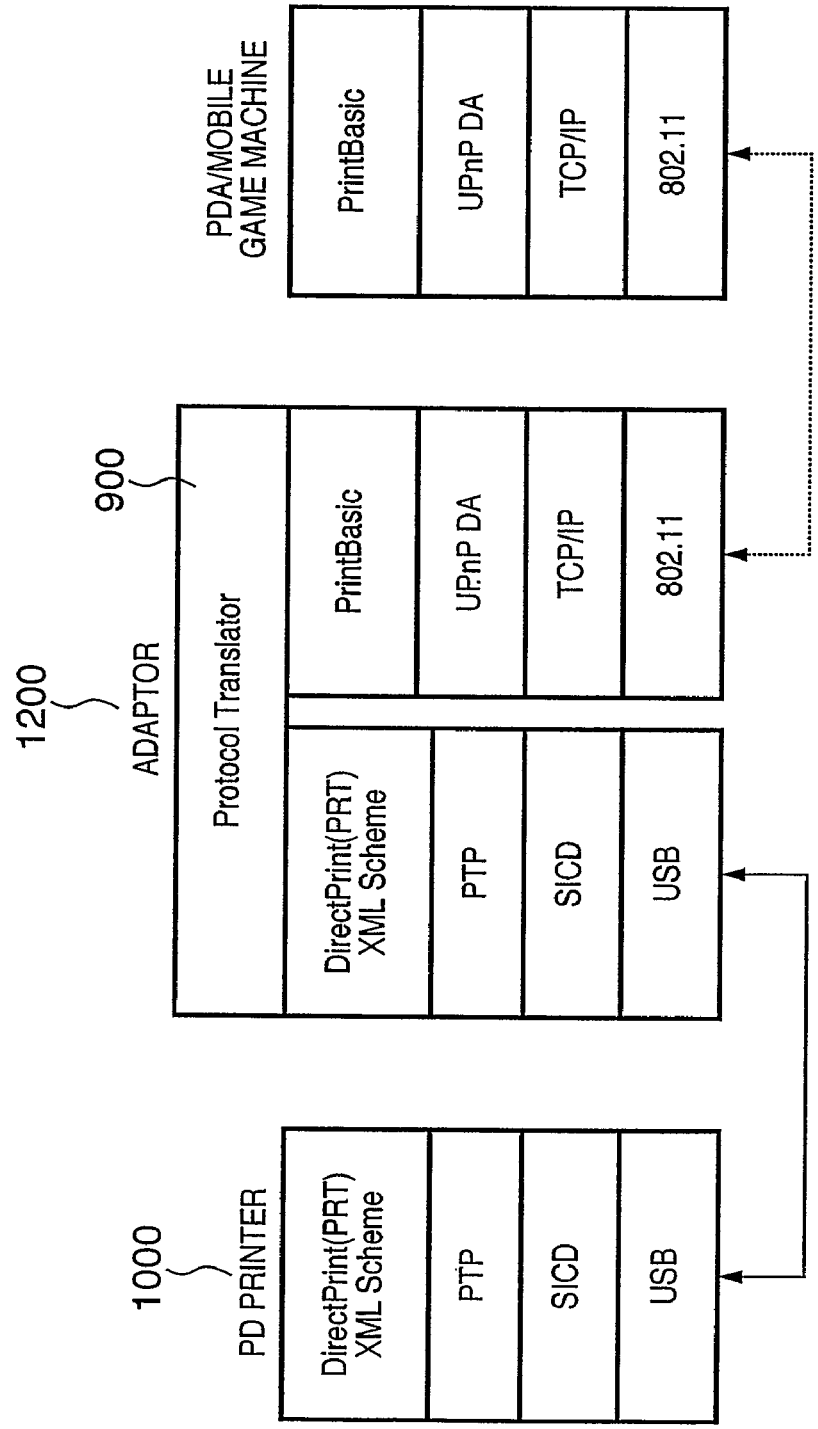
FIG. 13 depicts a view showing the structures of the communication protocol stacks of the PD printer, the adaptor, and a PDA with a 802.11 device according to the embodiment of the present invention.

FIG. 13 depicts a view showing an example of the structure of a protocol stack when the adaptor 1200 and a PC, PDA, or mobile game machine communicate with each other using 802.11x. Print Basis may be IPP or PTP/IP.

A description of the layers of these protocol stacks will be omitted. Basically, similar to the above-described example of IrDA, the direct printing information is generated by the protocol translator 900 using image data received from an image data supply source, and a direct printing job is issued to the PD printer 1000. Examples of the image data supply source using various communication means are a car navigation system, PC, game machine, digital TV, and other devices, in addition to the above-mentioned cellular phone.

Figure 14:
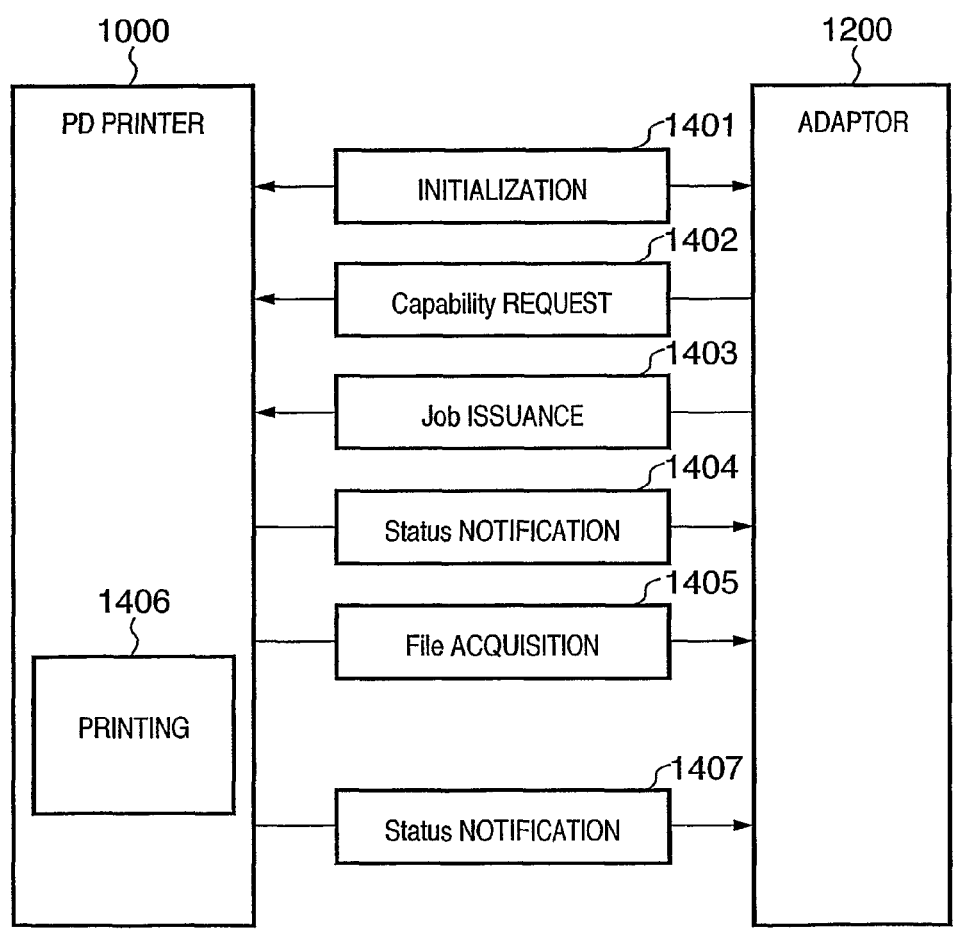
FIG. 14 depicts a view for explaining exchange of data between the PD printer and the adaptor when direct printing is done by USB-connecting the PD printer and adaptor according to the embodiment.

FIG. 14 depicts a view for explaining exchange of data between the PD printer 1000 and the adaptor 1200 when direct printing is done by USB-connecting the PD printer 1000 and adaptor 1200 according to the embodiment. FIG. 14 shows a case wherein direct printing is implemented by the PTP architecture shown in FIG. 9.

After the PD printer 1000 and adaptor 1200 are physically connected, initialization is performed between the PD printer 1000 and the adaptor 1200 (1401). At this time, the PD printer 1000 and adaptor 1200 confirm that their partners comply with direct printing. The adaptor 1200 issues a request for Capability of the PD printer 1000, and acquires Capability of the PD printer 1000 (1402). The adaptor 1200 issues a job to the PD printer 1000, and requests the PD printer 1000 to print (1403). The PD printer 1000 notifies the adaptor 1200 of Status, and notifies it of the start of a print process (1404). The PD printer 1000 requests the adaptor 1200 to acquire a file, and acquires an image file necessary for the print process (1405). The PD printer 1000 executes the print process to complete printing (1406). Finally, the PD printer 1000 notifies the adaptor 1200 of Status, and notifies it of the completion of the print process (1407).

In 1401 to 1404 and 1407, the PD printer 1000 and adaptor 1200 exchange their information by exchanging scripts. In 1405, pure file transfer directly using the PTP protocol is executed. In this case, file transfer operations such as "GetObject" and "GetPartialObject" are used. The print process 1406 is an internal process in the PD printer 1000.

Details of the respective processes will be explained with reference to FIGS. 15 to 19.

FIG. 15 depicts a view showing the flow of an initialization process in direct printing using USB in 1401 of FIG. 14.

After the PD printer 1000 and adaptor 1200 are physically connected, the PD printer 1000 transmits "GetDeviceInfo" to the adaptor 1200 (1501). By "GetDeviceInfo", the PD printer 1000 requests, of the adaptor 1200, information associated with objects held by the adaptor 1200. The adaptor 1200 transmits information about objects held by the adaptor 1200 to the PD printer 1000 by "DeviceInfo Dataset" (1502). By "OpenSession" (1503), a start request of procedures that assign the adaptor 1200 as an image data resource, assign handles to data objects as needed, and make a special initialization process is issued. Upon reception of an acknowledgement (OK) from the adaptor 1260, PTP communications start.

The PD printer 1000 requests the adaptor 1200 to send all script handles (Storage ID: FFFFFF, Object Type: Script) (1504). In response to this request, the adaptor 1200 returns a list of all handles held by it (1505). Information of the i-th object handle is acquired from the PD printer 1000 (1506, 1507). If this object includes a keyword (e.g., "Marco") indicating identification of the adaptor 1200, the PD printer 1000 instructs the adaptor 1200 to send object information (SendObjectInfo) (1508). Upon reception of an acknowledgement (OK) in response to this instruction, the PD printer 1000 transmits object information to the adaptor 1200 by "SendObject". Note that this object includes, e.g., "Polo" as a response keyword corresponding to the keyword received in 1507.

In this manner, the PD printer 1000 and adaptor 1200 can recognize each other as connected partners. After that, direct printing can start.

Figure 16A:
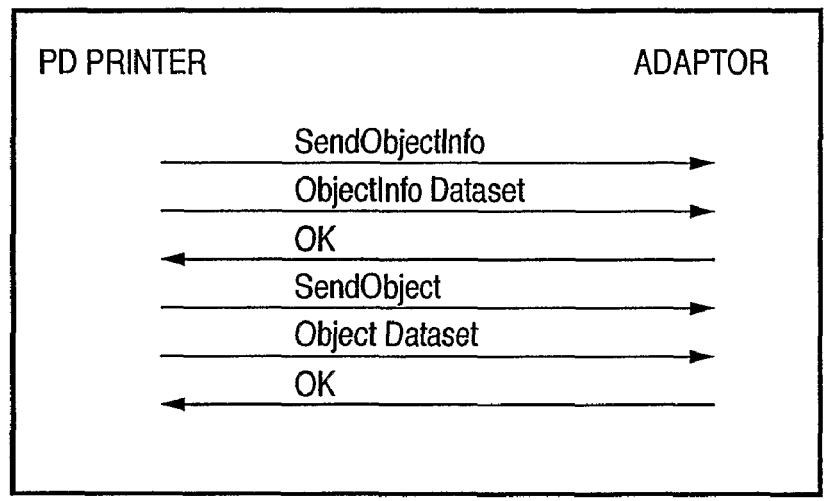
FIGS. 16A and 16B depict views for explaining the flow of a script transfer process in direct printing by USB between the PD printer and the adaptor according to the embodiment.
Figure 16B:
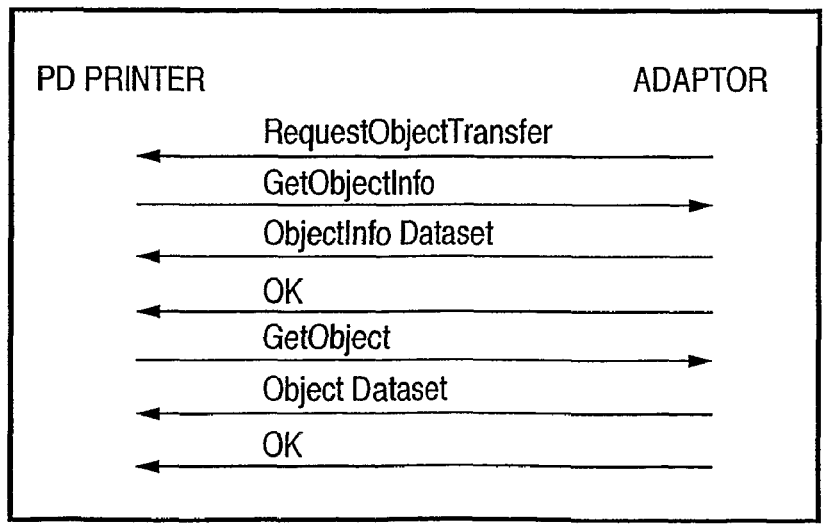

FIGS. 16A and 16B depict views for explaining the flow of a script transfer process in direct printing by USB between the PD printer 1000 (host) and the adaptor 1200 (slave). FIGS. 16A and 16B show common communication procedures at PTP level in 1402 to 1404 and 1407 of FIG. 14.

FIG. 16A shows a procedure of transmitting a script from the PD printer 1000 to the adaptor 1200.

First, the PD printer 1000 sends an object information transmission request to the adaptor 1200 by "SendObjectInfo". Then, the PD printer 1000 transmits "ObjectInfoDataset" to the adaptor 1200 to notify the adaptor 1200 of information about an object. Upon reception of "ObjectInfoDataset", the adaptor 1200 analyzes the object information, and if it can receive the object body, replies "OK" together with an object handle number assigned to an object to be received. Subsequently to the "OK" response, the PD printer 1000 sends an object body transmission request to the adaptor 1200 by "SendObject". The PD printer 1000 transmits "Object Dataset" to transmit the object body to the adaptor 1200 in the Script form. The adaptor 1200 receives the object body, and after receiving the object body, replies "OK".

FIG. 16B depicts a view showing a procedure of transmitting a script from the adaptor 1200 to the PD printer 1000.

First, the adaptor 1200 transmits "RequestObjectTransfer" to the PD printer 1000 to prompt the PD printer 1000 to acquire an object of a predetermined object handle. In response to "RequestObjectTransfer", the PD printer 1000 notifies the adaptor 1200 of a request to acquire object information of the object of the predetermined object handle. Upon reception of "GetObjectInfo", the adaptor 1200 transmits, to the PD printer 1000, information "ObjectInfo Dataset" about the object to be transmitted, and replies "OK" upon the completion of transmission. Subsequently to the response "OK", the PD printer 1000 sends an object body transmission request by "GetObject". Upon reception of "GetObject", the adaptor 1200 transmits, to the PD printer 1000, the object body of the object to be transmitted, and transmits "OK" upon the completion of transmission.

In this manner, the PD printer 1000 and adaptor 1200 exchange their information by exchanging scripts in direct printing by USB.

FIGS. 17A and 17B to FIGS. 19A to 19B depict views for explaining examples of scripts exchanged in direct printing by USB according to the embodiment.

FIGS. 17A and 17B depict views showing an example of a Capability acquisition script in direct printing by USB according to the embodiment. This script is used in the above-described process 1402 of FIG. 14.

FIG. 17A shows an example of a Capability request script transmitted from the adaptor 1200 to the PD printer 1000. In this example, the type of image format supported by the PD printer 1000 is requested by <Format/>.

FIG. 17B shows an example of a response script transmitted from the PD printer 1000 to the adaptor 1200 in response to the Capability request shown in FIG. 17A. In this example, "JPEG" and "PNG" sandwiched between <Format> and <Format/> describe that the PD printer 1000 supports two image formats JPEG and PNG.

The Capability request script shown in FIG. 17A is transmitted from the adaptor 1200 to the PD printer 1000 by "Object Dataset" in FIG. 16B. The response script shown in FIG. 17B is transmitted from the PD printer 1000 to the adaptor 1200 by "Object Dataset" in FIG. 16A.

In addition to the above Capability information, the Capability acquisition script is also used to exchange Capability information such as a supported size of print paper, the type of print paper, a layout printing function corresponding to each size of print paper, a fixed-size printing function, printing quality, image correction, image cut, date printing, or file name printing.

FIGS. 18A to 18C depict an example of a job issuing script in direct printing by USB according to the embodiment. This script is used in the above-described process 1403 of FIG. 14.

FIG. 18A shows an example of a job issuing script transmitted from the adaptor 1200 to the PD printer 1000. In this example, printing of a JPEG image having an object handle number "00000001" is requested. The job issuing script is transmitted from the adaptor 1200 to the PD printer 1000 by using "Object Dataset" in FIG. 16B.

FIG. 18B shows an example of a response script which is transmitted from the PD printer 1000 to the adaptor 1200 in response to the job issuing script in FIG. 18A by using "Object Dataset" in FIG. 16A. In this example, the PD printer 1000 replies "OK" upon acceptance of a print job.

FIG. 18C shows another example of the response script which is transmitted from the PD printer 1000 to the adaptor 1200 in response to the job issuing script in FIG. 18A by using "Object Dataset" in FIG. 16A. In this example, the PD printer 1000 cannot execute any print job, and replies "NG" representing rejection.

In addition to the image format, the job issuing script is also used to designate, e.g., a paper size, as described in association with the Capability acquisition script.

The job issuing script is also used to designate a plurality of images by one job issuing script, or designate the number of copies of each image, a clipping area, a date, or a file name.

The rejection content in FIG. 18C is used to represent "NG", and also to notify the adaptor 1200 that the reason of rejection is printing from another image data source, a setting error of a print job, or the like.

FIGS. 19A and 19B depict views showing an example of a Status notification script in direct printing by USB according to the embodiment. This script is used in 1404 and 1407 of FIG. 14.

FIG. 19A shows an example of a Status notification script transmitted from the PD printer 1000 to the adaptor 1200 by using "Object Dataset" in FIG. 16A. In this example, a standby status "IDLE" in which the PD printer 1000 is idle at present and can start printing is notified of the adaptor 1200.

FIG. 19B shows an example of a response script which is transmitted from the adaptor 1200 to the PD printer 1000 by using "Object Dataset" in FIG. 16B in response to the Status notification script in FIG. 18A. In this example, the adaptor 1200 replies "OK".

In addition, the Status notification script is also used to notify the adaptor 1200 of generation of an error in the PD printer 1000, the type of generated error, or the status of a job during printing (e.g., the number of pages during printing or the number of print sheets). The Status notification script is also used to exchange information such as whether the PD printer 1000 can complete a print job even if the cable is disconnected, whether the PD printer 1000 can accept the next print job, or whether Capability of the PD printer 1000 has been updated, or a reason of a print job end.

The status is used not only when the PD printer 1000 notifies the adaptor 1200 of a status, but also when the adaptor 1200 requests a status of the PD printer 1000.

In addition to acquisition of Capability, issuing of a job, and notification of a status described in the above examples, exchange of a script may also be utilized for commands such as interruption of a print job, recovery from an error, and confirmation/exchange of authentication information (e.g., version information, device name, serial number, or vendor name).

FIG. 20 depicts a view for explaining the flow of a process in initialization and file transfer when the adaptor 1200 and cellular phone 1100 communicate with each other via the infrared interface 1101 according to the embodiment. In FIG. 20, file transfer is executed by an IrOBEX architecture shown in FIG. 9.

The cellular phone 1100 issues a connection confirmation "CONNECT" to the adaptor 1200 (2011). When the adaptor 1200 permits connection with the cellular phone 1100, the adaptor 1200 replies "SUCCESS" (2012). The cellular phone 1100 transmits a start packet among all data containing information (e.g., the file name and size of a file to be transferred) and a file body (PUT) (2013). Upon reception of the start packet, the adaptor 1200 sends back a response "CONTINUE" representing that the next data can be sent (2014). In response to this, the cellular phone 1100 transmits the next packet (PUT) (2015). After the adaptor 1200 normally receives the packet, it sends back a response "CONTINUE" representing that the next data can be sent (2016). In this same manner, 2017 and 2018 are repeated by the number of packets to be transmitted. The cellular phone 1100 transmits the final packet (PUT) (2019). After the adaptor 1200 normally receives the final packet, it sends back, to the cellular phone 1100, a response "SUCCESS" representing that data reception is completed. Thereafter, the procedure ends.

As described above, the adaptor 1200 assigns a PTP object handle to an image transmitted by "PUT" from the cellular phone 1100, and requests the PD printer 1000 to execute direct printing using the object handle.

The flow of a process when the adaptor 1200 and cellular phone 1100 are connected by Bluetooth as shown in FIG. 10 is almost the same as that shown in FIG. 20, and a description thereof will be omitted.

A process when the adaptor 1200 and cellular phone 1100 are connected by USB as shown in FIG. 11 adopts "SendObjectInfo" and "SendObject" procedures of PTP, and a description thereof will be omitted.

First Embodiment

The first embodiment of the present invention will be explained with reference to the above-described drawings and FIGS. 21 to 26. In order to explain the operation of an adaptor 1200 according to the first embodiment, interactions between a PD printer 1000, the adaptor 1200, and a cellular phone 1100 are illustrated in time series in these drawings. The operations of the PD printer 1000 and cellular phone 1100 are exemplified by the operations of corresponding available products.

<Operation Sequence when Adaptor is Connected>

Figure 21:
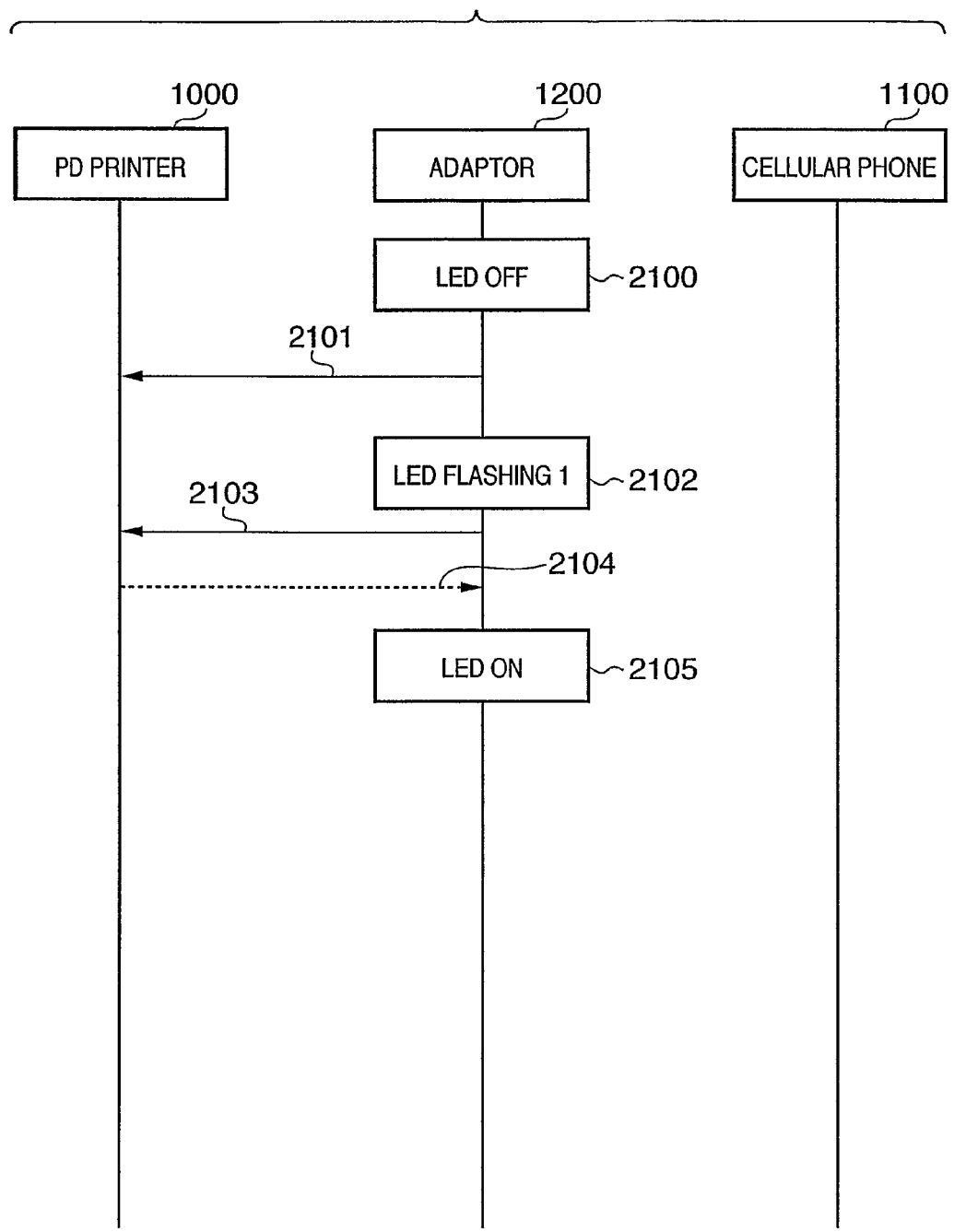
FIG. 21 depicts a view for explaining the operation sequence of a PD printer, adaptor, and cellular phone when the PD printer and adaptor are connected in a printing system according to the first embodiment of the present invention.

FIG. 21 depicts a view for explaining the operation sequence of the PD printer 1000, adaptor 1200, and cellular phone 1100 when the PD printer 1000 and adaptor 1200 are connected in a printing system according to the first embodiment of the present invention. Note that a change in the state of an LED (to be referred to as an indicator hereinafter) 1204 for displaying the state of the adaptor 1200 is also described in the operation sequence of the adaptor 1200.

In the first embodiment, display states of the indicator 1204 (FIGS. 6A and 7) are assigned as follows.

When the adaptor 1200 is OFF, the indicator 1204 is turned off. When the adaptor 1200 is establishing connection with the PD printer 1000, the indicator 1204 is driven for display in flashing 1 (for example, the indicator 1204 flashes in green once every second). When the adaptor 1200 has established connection with the PD printer 1000 and can accept image data from the cellular phone 1100, the indicator 1204 is turned on (for example, the indicator 1204 is turned on in green). While the adaptor 1200 receives image data from the cellular phone 1100, the indicator 1204 is driven for display in flashing 2 (for example, the indicator 1204 flashes in green five times every second). When the adaptor 1200 is transferring image data to the PD printer 1000 and executing a print job upon the completion of receiving image data from the cellular phone 1100, the indicator 1204 is driven in flashing 3 (for example, the indicator 1204 flashes in green twice every second). When the adaptor 1200 receives a print error notification from the PD printer 1000 and printing interrupts, the indicator 1204 is driven in flashing 4 (for example, the indicator 1204 flashes in yellow twice every second). Note that other states of the adaptor 1200 can also be represented by increasing the number of colors and/or the number of flashing patterns of the indicator 1204.

Each sequence will be explained by each reference numeral in FIG. 21.

Reference numeral 2100 denotes a state in which the adaptor 1200 and PD printer 1000 are not connected. In this case, the power supply is OFF, and the indicator 1204 is OFF. Reference numeral 2101 denotes a state in which the adaptor 1200 is connected to the USB terminal of the PD printer 1000. In this state, the adaptor 1200 is turned on by receiving electric power from the PD printer 1000 via a USB power supply circuit. Note that the adaptor 1200 may incorporate a battery, and operate by receiving electric power from the battery upon power-on operation of a power switch or the like. In this case, when the PD printer 1000 is portable, electric power consumption of the printer can be suppressed. When the battery is rechargeable, the adaptor 1200 can communicate with the cellular phone 1100 whose electric power consumption exceeds a USB power supply amount. In this case, the adaptor 1200 changes to a standby state for transfer of image data from the cellular phone 1100 only after the battery is sufficiently charged.

The adaptor 1200 is establishing connection with the PD printer 1000, and the indicator 1204 is driven for display in flashing 1 (2102). Note that the timing when flashing 1 starts may be set immediately after connection 2101 with the PD printer 1000 or immediately after the protocol of direct printing is established between the adaptor 1200 and the PD printer 1000 (2103). During the connection establishment process for direct printing, the adaptor 1200 may acquire Capability of the PD printer 1000, confirm paper sizes and paper types printable by the PD printer 1000, various image correction processes, and the like on the basis of the acquired Capability, and reflect the information on the print instruction UI of the adaptor 1200. For example, when the PD printer 1000 can print on only A4 and L-size paper sheets, only A4 and L sizes can be selected with the paper selection button of the UI of the adaptor 1200.

The adaptor 1200 establishes communication with the PD printer 1000 for direct printing (2103). The adaptor 1200 receives a connection establishment completion notification for direct printing from the PD printer 1000 (2104). Upon reception of the connection establishment completion notification for direct printing from the PD printer 1000, the adaptor 1200 establishes connection between the adaptor and the PD printer (2105). As a result, a part associated with connection for direct printing in the protocol stack of FIG. 9 is constructed. The adaptor 1200 changes the displaying state of the indicator 1204 from flashing 1 to the light-on state. When a rechargeable battery described above is employed, the indicator 1204 of the adaptor 1200 may not be turned on if the battery is not fully charged.

<Description from Start of Transferring Image Data from Cellular Phone to Completion of Printing>

Figure 22:
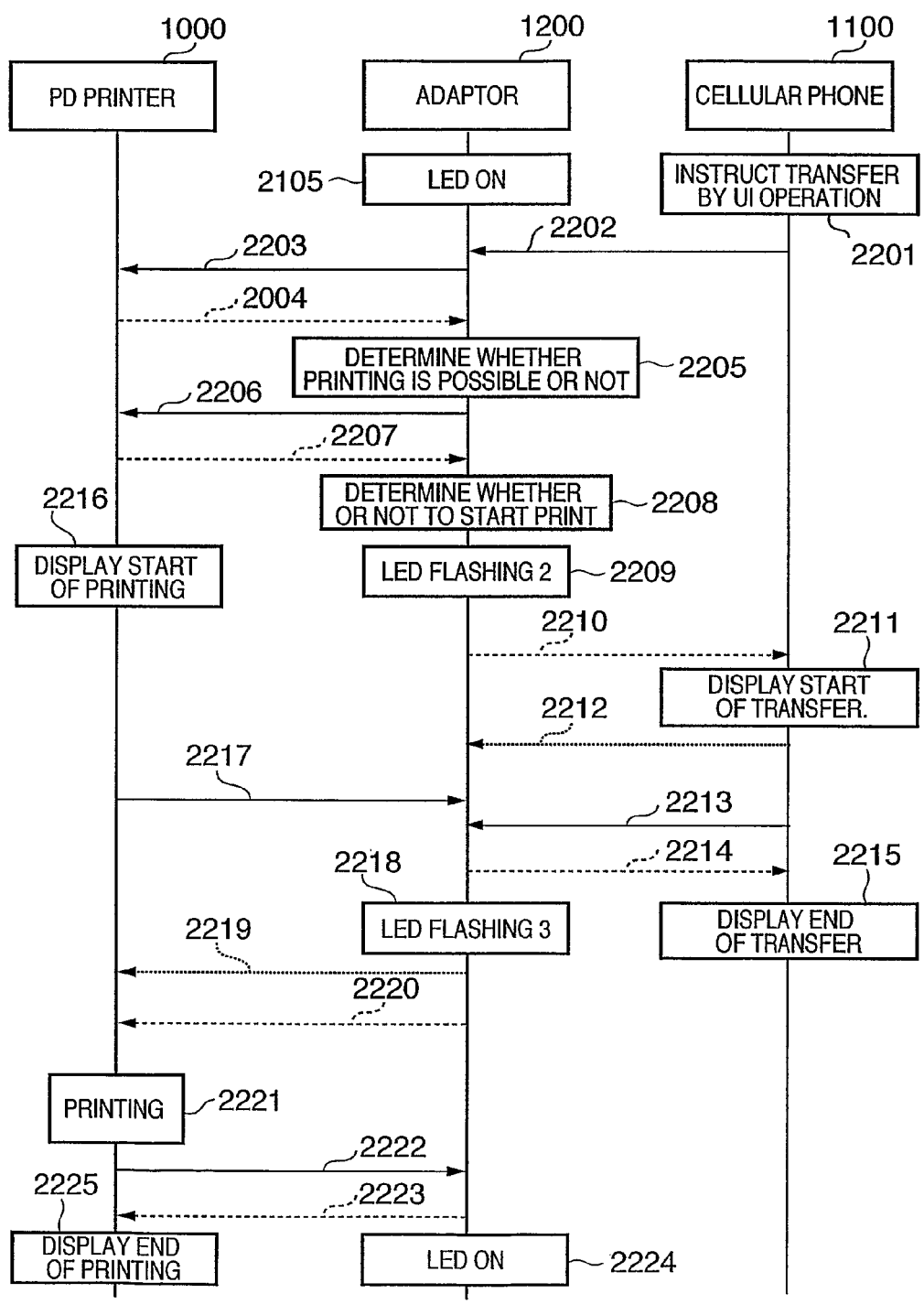
FIG. 22 depicts a view for explaining an operation sequence from the start of transferring an image file from the cellular phone to the completion of printing by the PD printer in the printing system according to the first embodiment of the present invention.

FIG. 22 depicts a view for explaining an operation sequence from the start of transferring an image file from the cellular phone 1100 to the completion of printing by the PD printer 1000 in the printing system according to the first embodiment of the present invention. At the start of this operation, as represented by 2105 in FIG. 21, connection between the adaptor 1200 and the PD printer 1000 has been established, the indicator 1204 is ON, and an image file from the cellular phone 1100 can be accepted by the adaptor 1200. In this state, the paper selection button of the adaptor 1200 may be operated to select a paper size for printing or set a paper type, the number of print sheets, whether or not to print a date, or the like.

While the user checks the display on a liquid crystal display 1102 of the cellular phone 1100, the user operates the buttons 1103 and designates an image file to be transferred to the PD printer 1000 (2201) via the adaptor 1200. Note that no communication connection need be established between the cellular phone 1100 and the adaptor 1200 while an image file to be transferred is designated in the cellular phone 1100. The user may perform this operation while the user is out with the cellular phone 1100. In this case, a step of a designation process for an image file to be transferred and a step of a transfer request process of requesting the adaptor 1200 to transfer the image file may be separately prepared, and the cellular phone 1100 may communicate with the adaptor 1200 in the step of sending a transfer request to the adaptor 1200.

Since connection between the PD printer 1000 and the adaptor 1200 and that between the adaptor 1200 and the cellular phone 1100 have been established, the cellular phone 1100 sends an image file transfer request to the adaptor 1200 (2202). If necessary, connection between the adaptor 1200 and the cellular phone 1100 may be established. In the first embodiment, a part associated with IrDA connection in the protocol stack of FIG. 9 is constructed.

Upon reception of the image file transfer request from the cellular phone 1100, the adaptor 1200 requests Capability of the PD printer 1000, confirms the capability of the printer 1000, and requests the PD printer 1000 to start a print job before the adaptor 1200 sends back a response representing that this transfer request is accepted. These procedures will be explained by a sequence from 2203 to 2207.

The adaptor 1200 requests Capability of the PD printer 1000 (2203). The PD printer 1000 transfers Capability to the adaptor 1200 (2204). On the basis of Capability received from the PD printer 1000 and information contained in the image file transfer request received from the cellular phone 1100, the adaptor 1200 determines whether the image file to be transferred from the cellular phone 1100 can be printed by the PD printer 1000 (2205). As an example of this determination, the adaptor 1200 determines that the image file can be printed if the format of the image file to be transferred from the cellular phone 1100 coincides with that of an image file printable by the PD printer 1000, and determines that the image file cannot be printed if these formats do not coincide with each other. In the sequence of FIG. 22, it is determined that the image file can be printed. An operation when it is determined that no image file can be printed will be explained with reference to the flowchart (to be described later) in FIG. 23.

The adaptor 1200 sends a print request to the PD printer 1000 (2206). At this time, if information on a print job is necessary to send a print request, print job information may be generated on the basis of the transfer request received from the cellular phone 1100. The PD printer 1000 sends back, to the adaptor 1200, a response (print acceptance) representing that the PD printer 1000 has accepted the print request (2207). On the basis of the contents of the print request acceptance response from the PD printer 1000, the adaptor 1200 determines whether the request has been accepted by the PD printer 1000 (2208). At this time, the state of the PD printer 1000 may be acquired in advance. For example, if a printer state described in the response from the PD printer 1000 is "ready for printing", the adaptor 1200 determines that printing is possible. If the PD printer 1000 is executing a print job from the PC and is busy, the adaptor 1200 determines that printing is impossible. Further, if printing is impossible because, for example, an access cover 1003 is open, no paper sheet is set in the PD printer 1000, or no ink is set, the adaptor 1200 determines that printing is impossible. In FIG. 22, it is determined that the print request has been accepted. An operation in a case that it is determined that no print request has been accepted will be explained with reference to the flowchart (to be described later) in FIG. 23.

If the adaptor 1200 determines that printing is possible, the indicator 1204 is driven for display in flashing 2 (2209) while the adaptor 1200 receives the image file from the cellular phone 1100. The timing when flashing 2 starts may be set immediately after acceptance 2207 of the print request, or immediately after acceptance 2210 of the transfer request from the adaptor 1200 to the cellular phone 1100. The adaptor 1200 notifies the cellular phone 1100 that the transfer request has been accepted (2210).

The cellular phone 1100 displays, on the liquid crystal display 1102, a message that transfer of the image file will start (2211). The cellular phone 1100 transfers the image file to the adaptor 1200 (2212). The transferred image file is written in a RAM 3203 of the adaptor 1200. In writing the image file, a write address in the RAM 3203 may be fixed to overwrite a previously transferred image file. Alternatively, the RAM 3203 may be treated as a ring buffer to determine the write address of the next image file on the basis of the storage address of a previous image file. If a large-capacity RAM 3203 can be prepared, the log of transferred image files can be held in the RAM 3203 by adopting the ring buffer format in the latter case. By giving a proper UI to the adaptor 1200, an application can be made such that an image file which has been transferred by UI operation of the adaptor 1200 can be printed again without transferring the image file from the cellular phone 1100 to the adaptor 1200 again.

After the cellular phone 1100 transfers all image data of the image file, it notifies the adaptor 1200 of the end of transferring the image file (2213). Note that a convention of the transfer protocol may be utilized, and the adaptor 1200 may be notified that data is the final data, as an image transfer end notification in transferring the final image data. The adaptor 1200 sends back, to the cellular phone 1100, a message that the adaptor 1200 has accepted the image transfer end notification (2214). The cellular phone 1100 displays, on the liquid crystal display 1102, a message that data transfer has ended (2215).

The PD printer 1000 displays, on a liquid crystal display 1006, a message that printing will start (2216). The PD printer 1000 requests the adaptor 1200 to transfer an image file to be printed (2217). After the adaptor 1200 receives the image file from the cellular phone 1100, the adaptor 1200 drives the indicator 1204 for display in flashing 3 because the PD printer 1000 is executing the print job. The timing when flashing 3 starts may be set immediately after image file transfer end notification (2213) from the cellular phone 1100, immediately after image transfer end acceptance (2214) from the adaptor 1200 to the cellular phone 1100, or immediately before image file transfer from the adaptor 1200 to the PD printer 1000 (2219). The adaptor 1200 transfers, to the PD printer 1000, the image file which the cellular phone 1100 requests the adaptor 1200 to print (2219). After the adaptor 1200 transferred all data of the image file to the PD printer 1000, it notifies the PD printer 1000 of the end of image transfer (2220). Note that a convention of the transfer protocol may be utilized, and the PD printer 1000 may be notified that image data is the final data, as an image transfer end notification in transferring the final image data.

The PD printer 1000 prints on the basis of the image file accepted from the adaptor 1200 (2221). After printing ends, the PD printer 1000 notifies the adaptor 1200 of the end of printing (2222). The adaptor 1200 sends back, to the PD printer 1000, a response representing that the adaptor 1200 has accepted the print end notification (2223). The PD printer 1000 displays, on the liquid crystal display 1006, a message that printing has ended (2225). After the adaptor 1200 confirms the end of printing by the PD printer 1000, the adaptor 1200 can receive a new image file from the cellular phone 1100, and it turns on the indicator 1204 (2224). Note that the timing when the indicator 1204 is turned on may be set immediately after the adaptor 1200 is notified by the PD printer 1000 of the end of printing (2222) or immediately after the adaptor 1200 sends back the end acceptance response to the PD printer 1000 (2223).

In the first embodiment, an image file written in the RAM 3203 of the adaptor 1200 may be automatically erased at the end of printing (2223). By erasing a printed image file from the RAM 3203, even a highly confidential image file can be safely printed.

<Description of Process by Adaptor>

Figure 23:
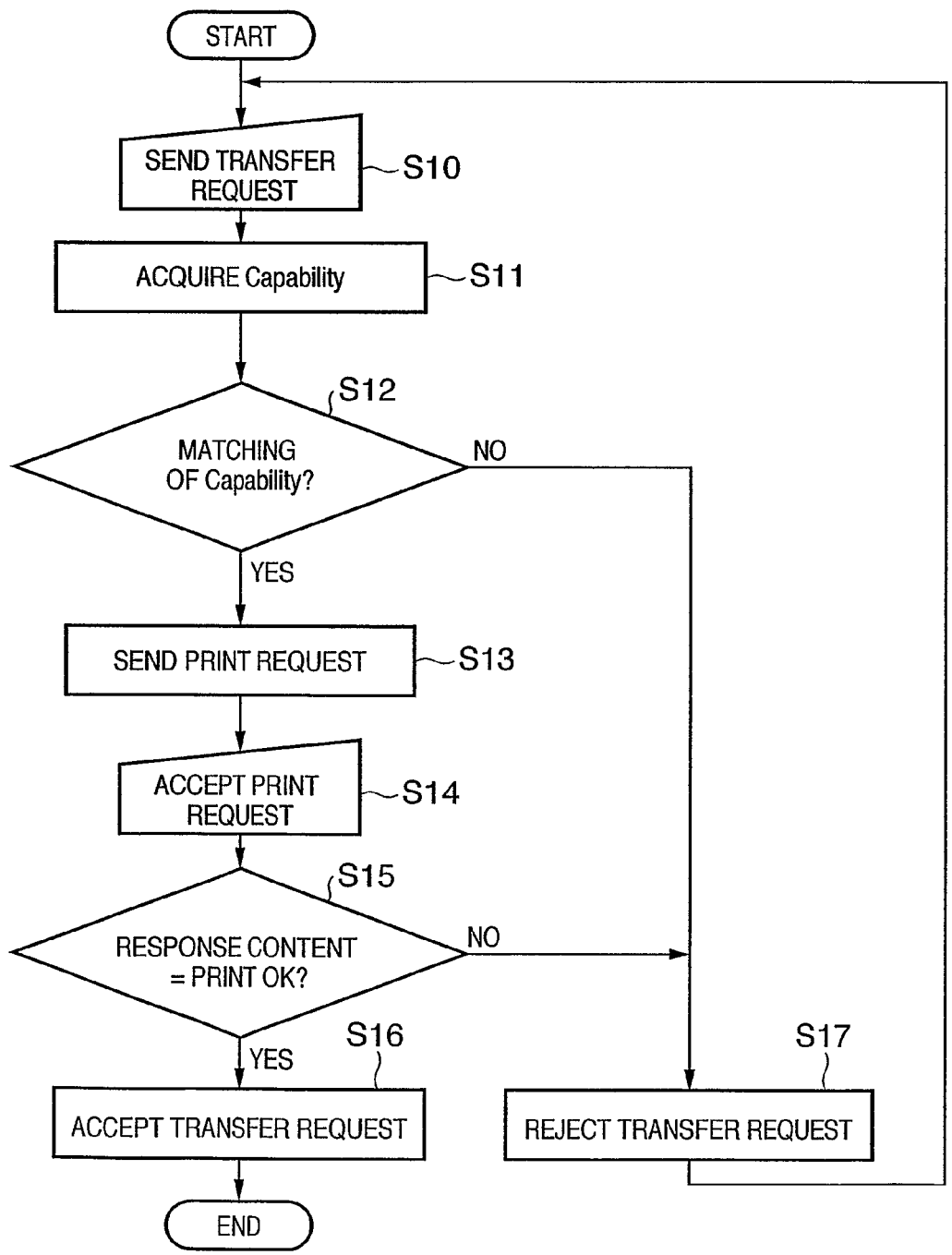
FIG. 23 is a flowchart for explaining a process when the adaptor accepts an image file transferred from the cellular phone according to the first embodiment.

FIG. 23 is a flowchart for explaining a process in a case that the adaptor 1200 accepts an image file transferred from the cellular phone 1100 according to the first embodiment. A program for executing this process is stored in the ROM 3202 and executed under the control of a CPU 3201. Note that this process starts when connection between the adaptor 1200 and the PD printer 1000 has been completed and the indicator 1204 is ON.

In step S10, the adaptor 1200 establishes connection with the PD printer 1000 for direct printing, and waits until an image file transfer request (2202) is transmitted from the cellular phone 1100. Upon reception of the transfer request from the cellular phone 1100, the adaptor 1200 holds the transfer request notification in the RAM 3203. The flow advances to step S11, and the adaptor 1200 requests Capability of the PD printer 1000 (2203), acquires Capability (2204) of the printer 1000, and holds it in the RAM 3203. In step S12, the adaptor 1200 checks Capability obtained in step S11 and an image file format contained in the image transfer request sent from the cellular phone 1100. The adaptor 1200 determines whether the PD printer 1000 supports the format of an image file sent from the cellular phone 1100 (2205). If the PD printer 1000 supports the format, the flow advances to step S13. Otherwise, the flow advances to step S17. In step S17, the adaptor 1200 notifies the cellular phone 1100 of information representing that transfer of the image file is rejected. At this time, the cellular phone 1100 may be notified of rejection of transfer by generating time-out in the cellular phone 1100 without sending any response to the transfer request from the cellular phone 1100. Alternatively, a flashing pattern of the indicator 1204 may be employed to represent rejection of transfer to a transfer request from the cellular phone 1100, and may be displayed for a predetermined time.

In step S13, the adaptor 1200 sends a print request to the PD printer 1000 (2206). Note that the adaptor 1200 may acquire the state of the PD printer 1000 before notification of the print request, and if the PD printer 1000 is not ready, the flow may advance to step S17 without sending any print request to the PD printer 1000. In step S14, the adaptor 1200 waits until the PD printer 1000 accepts a print request and sends back a response. Upon reception of the response (2207), the adaptor 1200 confirms the contents of the print request acceptance response from the PD printer 1000, and determines whether the PD printer 1000 can execute printing (2208). If the PD printer 1000 cannot execute printing, the flow advances to step S17. If the PD printer 1000 can execute printing, the flow advances to step S16, and the adaptor 1200 responds to the image transfer request received from the cellular phone 1100 in step S10 by transfer request acceptance representing that the cellular phone 1100 can start transferring an image file (2213). After that, the adaptor 1200 receives an image file transferred from the cellular phone 1100 and stores the image file in the RAM 3203. If the PD printer 1000 cannot execute printing, the adaptor 1200 responds to the image transfer request by transfer request rejection representing that transfer of an image file is rejected. In this case, the cellular phone 1100 does not transfer any image file to the adaptor 1200.

<Description of Operation when Printer Interrupts Printing>

Figure 24:
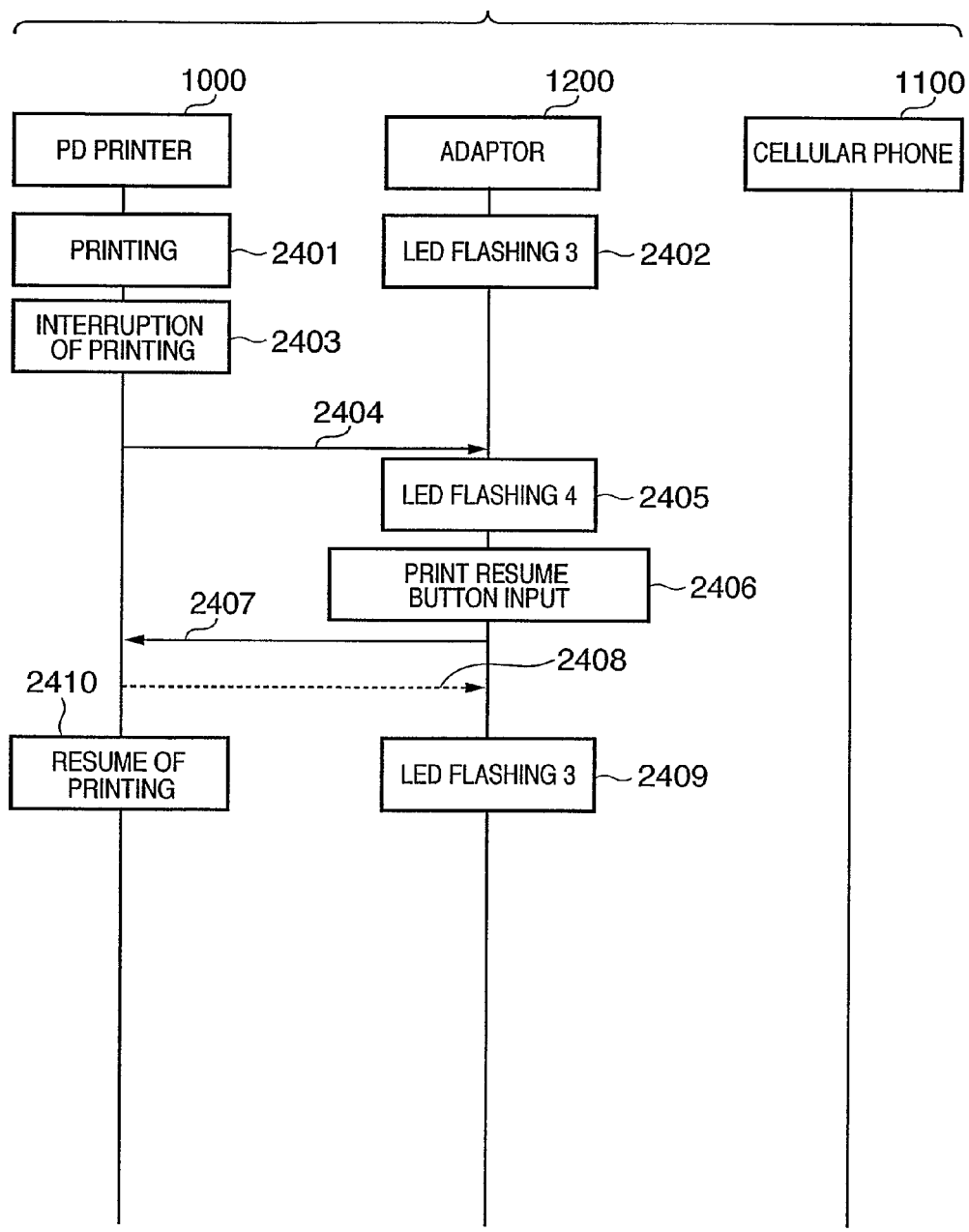
FIG. 24 depicts a view for explaining an operation until printing resumes after the PD printer interrupts printing in the printing system according to the first embodiment of the present invention.

FIG. 24 depicts a view for explaining an operation until printing resumes after the PD printer 1000 interrupts printing in the printing system according to the first embodiment of the present invention. Note that a case wherein the PD printer 1000 interrupts printing is assumed to be a case wherein printing cannot continue unless the user takes any measure, for example, in a case where a print sheet jams in the printer, no print sheet is set in the printer, or ink or the remaining battery amount is insufficient.

The PD printer 1000 prints on the basis of image data received from the adaptor 1200 (2401). The adaptor 1200 has received an image file from the cellular phone 1100, and drives the indicator 1204 for display in flashing 3 while the PD printer 1000 executes a print job (2402). In the PD printer 1000, if an event which causes to stop printing occurs, then the print process is interrupted (2403). In the first embodiment, for example, print sheets in the PD printer 1000 run short, failing to feed a paper sheet. The PD printer 1000 notifies the adaptor 1200 of an error representing that no paper sheet exists. The error notification method complies with the print protocol.

Upon reception of the paper absence error notification, the adaptor 1200 switches the indicator 1204 to display in flashing 4 (2405). Based on this display, the user can recognize that any problem occurs in the PD printer 1000. In this case, the user determines that paper sheets run short, and sets paper sheets. If the error is an unrecoverable error, the print process is canceled, the indicator 1204 is turned on, and the adaptor 1200 returns to the state 2105 in FIGS. 21 and 22. In order to explicitly inform the user that printing ended with an error, the indicator 1204 may be changed to flashing 4 or another flashing. If a print resume button 1201 of the adaptor 1200 is pressed, the indicator 1204 may be turned on, and the adaptor 1200 may return to the state 2105 in FIG. 21.

If the user sets paper sheets and the PD printer 1000 can print, the user presses the print resume button 1201 of the adaptor 1200 (2406). The adaptor 1200 detects the press of the print resume button 1201, and transmits a print process resume request to the PD printer 1000 (2407). Depending on the direct printing method, the print process may be resumed by pressing a print start key 2005 of the PD printer 1000 to designate resume of printing. In this case, the PD printer 1000 transmits the print resume notification to the adaptor 1200 (2408). Upon reception of the print process resume notification, the indicator 1204 of the adaptor 1200 may be driven for display in flashing 3 (2409). In this case, sequences 2408 and 2410 are omitted.

If the PD printer 1000 notifies the adaptor 1200 that the PD printer 1000 has accepted resume of printing (2408), it confirms that the PD printer 1000 has recovered from the error which has interrupted printing, and resumes the print process (2410). While the PD printer 1000 executes the print job, the adaptor 1200 drives the indicator 1204 for display in flashing 3 again (2409).

As described above, the first embodiment has the following effects.

(1) The adaptor mediates between the printer and a cellular phone which cannot implement direct printing with the printer. The adaptor creates print data usable by the printer on the basis of image data received from the cellular phone, and transfers the print data by using a direct printing protocol interpretable by the printer. Consequently, direct printing can be implemented between the cellular phone and the printer.

(2) The adaptor accepts image data from the cellular phone only in a case where the printer can print, and rejects reception of image data from the cellular phone in a case where the printer cannot print. Accordingly, the user who operates the cellular phone can easily grasp a print status.

(3) When the adaptor receives image data from the cellular phone, the adaptor requests direct printing of the printer before the completion of the image data transfer process from the cellular phone to the adaptor. This can prevent acceptance of a print request from another device by a prospective printer to delay printing of an image from the cellular phone.

(4) Since the adaptor has a function for displaying a print status in direct printing, the user can be informed of the print status of the printer. Since the adaptor has a print setting UI for direct printing, the user can operate the UI of the adaptor to make print settings. For example, in a case where the user uses a low-end printer having no means for setting the type of print paper, and a cellular phone which has an IrDA terminal and camera but does not have any paper setting means, a user can set a desired paper sheet and print an image from the cellular phone by the PD printer. Printing can be done on a paper sheet of an arbitrary size and type.

Modifications (A) and (B) To First Embodiment (A) In FIG. 22, the adaptor 1200 starts transferring an image file to be printed to the PD printer 1000 upon the completion of receiving the image file from the cellular phone 1100. However, it is not always necessary to start transferring an image file to the PD printer 1000 after all data of the image file are transferred from the cellular phone 1100 to the adaptor 1200 and stored in the RAM 3203. For example, image data may be transferred to the PD printer 1000 on occasion while image data is stored in the RAM 3203 of the adaptor 1200. In this case, "fragments of print image data" can be obtained. Even before all print image data are acquired, the print process can start quickly using fragments of image data which have been received and stored. The time until the completion of the print process can be shortened.

(B) A print image file transfer request from the PD printer 1000 is issued only once in 2217 of FIG. 22, but may be sent by "image data piece transfer requests" prepared by dividing the image file transfer request from the PD printer 1000. In this case, similar to the above-mentioned example, the adaptor 1200 may transfer image data to the PD printer 1000 while storing image data pieces from the cellular phone 1100 in the RAM 3203 of the adaptor 1200. Since the PD printer 1000 can sequentially attain "print image data pieces", the print process can start quickly using the image data fragments even before all image data of the image file are acquired. The time period until the completion of printing can be shortened. Further, "print image data pieces" may be replaced with finer "fragments of print image data pieces".

The present invention is not limited to modifications A and B described above. By any data transfer method between the adaptor 1200 and the PD printer 1000, the same effects can be obtained in a case where image data received by the adaptor 1200 from the cellular phone 1100 are sequentially transferred to the PD printer 1000.

<Operation Sequence of (Modification A)>

Figure 25:
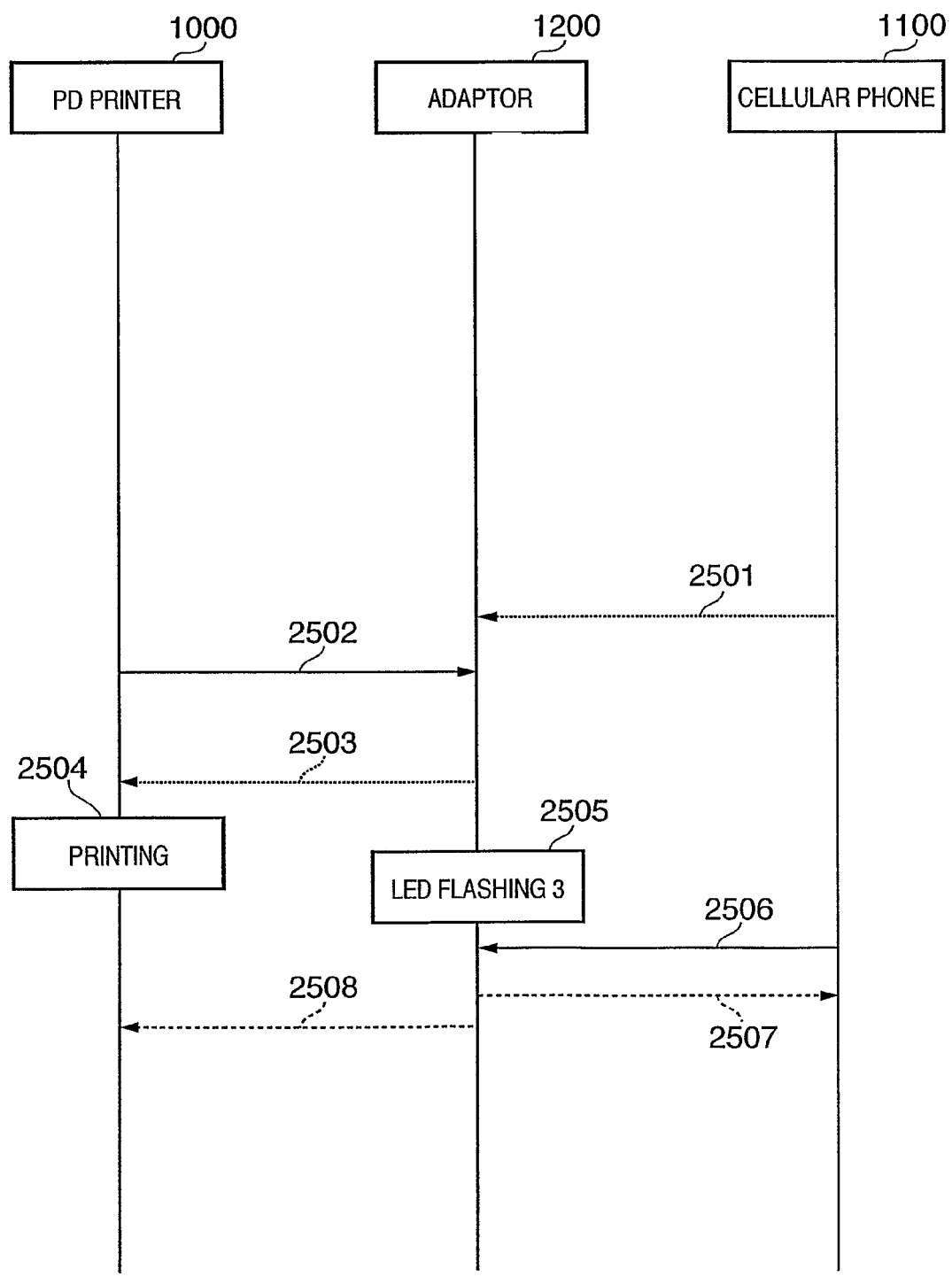
FIG. 25 depicts a view for explaining an operation sequence (modification A) in the printing system according to the first embodiment of the present invention.

FIG. 25 depicts a view for explaining an operation sequence (modification A) in the printing system according to the first embodiment of the present invention.

The cellular phone 1100 transfers an image data piece serving as part of an image file to the adaptor 1200 (2501). The PD printer 1000 transmits a print image data piece transfer request to the adaptor 1200.

In response to this, the adaptor 1200 transfers the image data piece received from the cellular phone 1100 to the PD printer 1000 (2503). The PD printer 1000 prints on the basis of the piece data of the image data that has been received from the adaptor 1200 (2504). For example, when a print image data fragment corresponding to a ¼ page is transferred from the adaptor 1200, the ¼ page can be printed.

While the PD printer 1000 executes the print job (2504), the indicator 1204 of the adaptor 1200 is driven for display in flashing 3 (2505). At this time, priority may be given to data transfer from the cellular phone 1100, and the indicator 1204 may repeat flashing 2 representing that data is being received from the cellular phone 1100. Alternatively, the indicator 1204 may be driven to alternately repeat flashing 2 and flashing 3 in order to represent both transfer of a data piece to the adaptor 1200 and the print process by the PD printer 1000. Alternatively, another flashing pattern for representing the state may be prepared.

After the cellular phone 1100 completes transmission of the image data to the adaptor 1200, it notifies the adaptor 1200 of the end of transferring image data (2506). Note that the adaptor 1200 may be notified of the end of transfer by notifying it of the final image data.

The adaptor 1200 transmits, to the PD printer 1000, the image data requested by the cellular phone 1100, and notifies the PD printer 1000 of the end of transferring the image data (2508). At this time, a convention of the transfer protocol may be utilized, and the PD printer 1000 may be notified that image data piece is the final data, as an image transfer end notification in transferring the final image data.

<Operation Sequence of (Modification B)>

Figure 26:
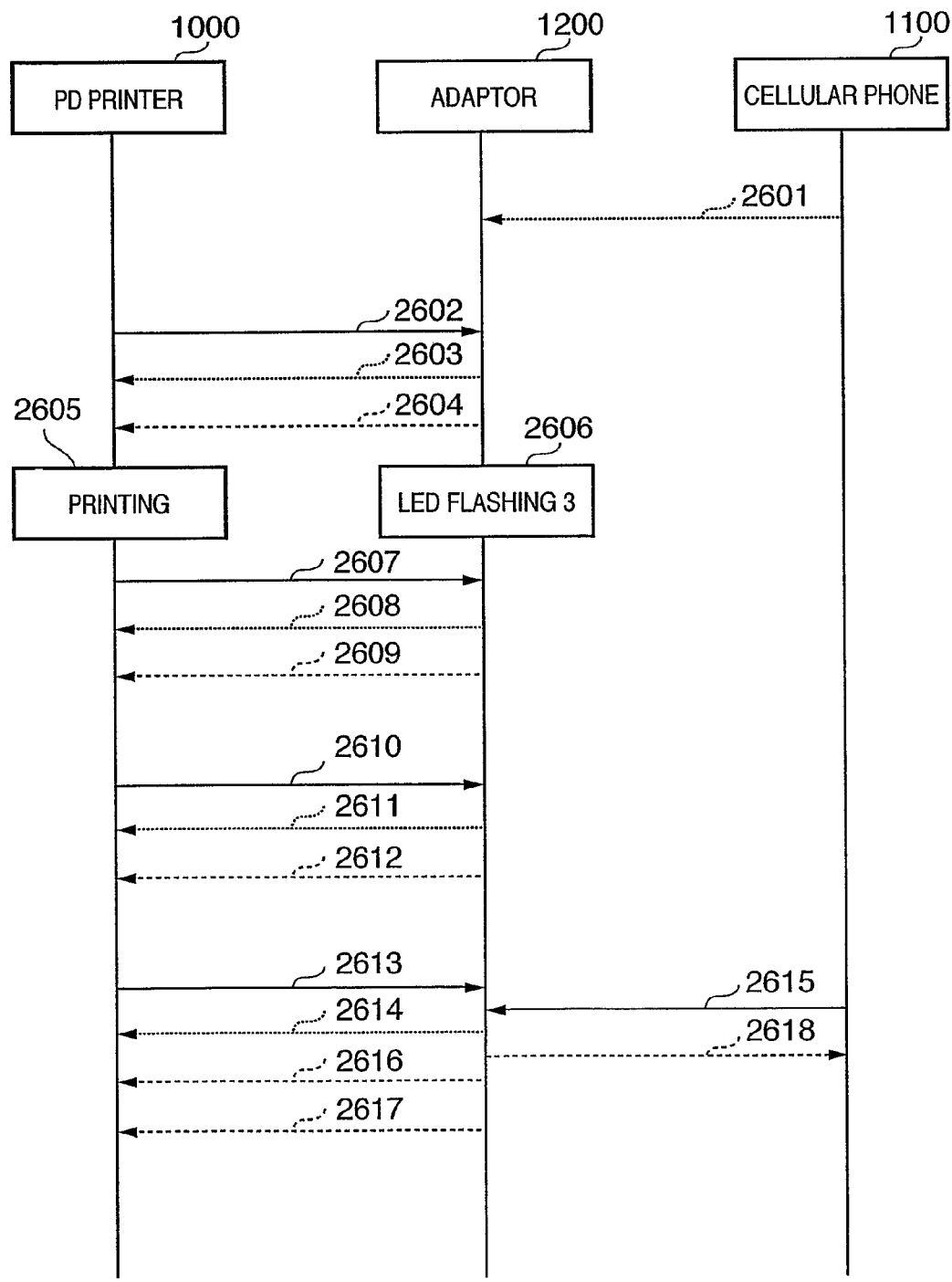
FIG. 26 depicts a view for explaining an operation sequence (modification B) in the printing system according to the first embodiment of the present invention.

FIG. 26 depicts a view for explaining an operation sequence (modification B) in the printing system according to the first embodiment of the present invention.

The cellular phone 1100 transfers an image file to the adaptor 1200 (2601). The PD printer 1000 requests, of the adaptor 1200, transfer of the first image data piece (part of the image file) (2602). The adaptor 1200 transfers the first requested image data piece to the PD printer 1000 (2603). The image data piece is generated on the basis of a fragment of the image data transferred from the cellular phone 1100. Similar to the above-mentioned (modification A), fragments of image data pieces may be sequentially transferred. When the adaptor 1200 transfers whole the first requested image data piece to the PD printer 1000, it notifies the PD printer 1000 that transfer of the first image data piece has ended (2604). At this time, a convention of the transfer protocol may be utilized, and the PD printer 1000 may be notified that transfer of an image data piece has ended, by sending a notification that data is the final data in transferring the first image data piece.

The PD printer 1000 sequentially prints on the basis of image data pieces received from the adaptor 1200 (2605). For example, when an image data piece corresponding to a ¼ page is transferred from the adaptor 1200 to the PD printer 1000, the ¼ page can be printed. Similar to (modification A), printing may be sequentially done on the basis of fragments of image data pieces.

While the PD printer 1000 executes printing of the image data pieces, the indicator 1204 of the adaptor 1200 repeats flashing 3. At this time, priority may be given to data transfer from the cellular phone 1100, and the indicator 1204 may repeat flashing 2 (representing that data is being transferred). Alternatively, the indicator 1204 may alternately repeat flashing 2 and flashing 3 in order to represent both data transfer and printing, or a new flashing pattern for representing the state may be prepared.

The PD printer 1000 transmits transfer requests for the second and third image data pieces to the adaptor 1200 (2607 and 2610). The adaptor 1200 transfers the second and third requested image data pieces to the PD printer 1000 (2608 and 2611). Each image data piece is generated on the basis of a fragment of image data transferred from the cellular phone 1100. After the adaptor 1200 transfers whole the second and third image data pieces to the PD printer 1000, it notifies the PD printer 1000 of the end of transferring the image data pieces (2609 and 2612).

The PD printer 1000 transmits a final image data piece transfer request to the adaptor 1200 (2613).

After the cellular phone 1100 transfers all image data to the adaptor 1200, it notifies the adaptor 1200 of the end of transferring the image file (2615). At this time, a convention of the transfer protocol may be utilized, and the adaptor 1200 may be notified that data is the final data, as a transfer end notification in transferring the final image data piece. The adaptor 1200 returns a response representing the end of transfer to the cellular phone 1100 (2618).

The adaptor 1200 transmits the final requested image data piece to the PD printer 1000 (2614). The image data piece is generated on the basis of a fragment of image data transferred from the cellular phone 1100. After the adaptor 1200 completes transmission of all the image data piece to the PD printer 1000, it notifies the PD printer 1000 of the end of transferring the image data piece (2617). This notification may be replaced with notifying the PD printer 1000 that data is the final data in the notification of sequence 2616.

Other Modifications

Other possible modifications will be enumerated below.

In the above-described embodiment, IrOBEX of the structure shown in FIG. 9 has been described as the communication protocol stack of the cellular phone 1100. The adaptor 1200 can also be applied to image data sources of other structures as shown in FIGS. 10 to 13. These protocols also have protocol stacks for communicating with an image data source and the PD printer 1000. The protocol translator 900 in FIGS. 10 to 13 generates a print request to the PD printer 1000 by using image data from the cellular phone 1100, and causes the PD printer 1000 to execute printing.

Methods of transferring image data and print data according to the first embodiment are merely examples, and the effects according to the first embodiment can be obtained regardless of a detailed order of transfer procedures or which of the transfer source and transfer destination performs transfer start procedures. For example, in the first embodiment, transfer of image data from the cellular phone 1100 to the adaptor 1200 starts on the basis of a transfer request notification from the cellular phone 1100. Alternatively, transfer of image data may start when the adaptor 1200 sends an image transfer request to the cellular phone 1100 and the cellular phone 1100 sends back image transfer acceptance.

By using various display patterns in addition to the display patterns of the indicator 1204 according to the first embodiment, various states of the adaptor 1200 can be presented more explicitly.

As a flashing pattern of the indicator 1204, the number of flashing patterns can also be increased by changing the ratio of ON and OFF times in one flashing. For example, a flashing pattern representing "during printing" is designed by "ON=0.1 sec and OFF=1 sec". This can shorten the ON time of the indicator 1204 and suppress electric power consumption of the adaptor 1200 low.

As a UI of the adaptor 1200, an LED or LCD which can display a numerical value or character string or another display device may be used to more explicitly display a state. In this case, in a case that the adaptor 1200 is connected to a printer having no UI, the adaptor 1200 can display various errors to inform the user of details of the operation statuses of the printer and adaptor 1200.

When communication from the cellular phone 1100 interrupts during transfer of image data from the cellular phone 1100 to the adaptor 1200, the adaptor 1200 may request the PD printer 1000 to interrupt printing as far as the communication is not restored for a predetermined time.

Note that data transfer between the cellular phone 1100 and the adaptor 1200 and communication in direct printing between the adaptor 1200 and the PD printer 1000 directly utilize existing protocols. Thus, a description of details of the data transfer and details of the communication will be omitted.

Second Embodiment

Figure 27:
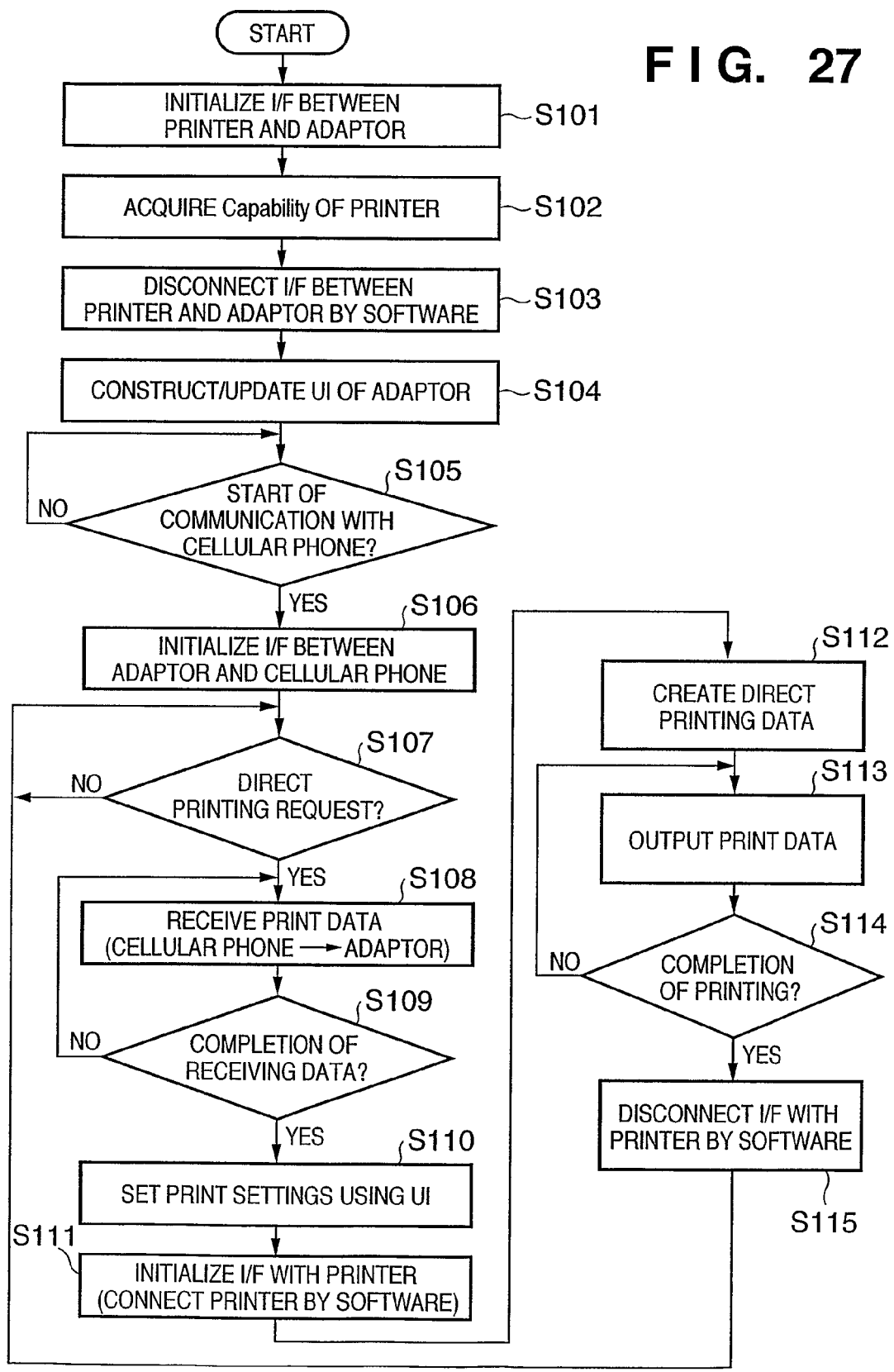
FIG. 27 is a flowchart for explaining a process by an adaptor according to the second embodiment.

FIG. 27 is a flowchart for explaining a process by an adaptor 1200 according to the second embodiment of the present invention. A program for executing this process is stored in the ROM 3202 and executed under the control of the CPU 3201. This process starts when it is detected that the PD printer 1000 and the adaptor 1200 are connected, or the PD printer 1000 to which the adaptor 1200 is connected is powered.

In step S101, the interface is initialized between the adaptor 1200 and the PD printer 1000. In the second embodiment, the PD printer 1000 and adaptor 1200 are connected by USB. The second embodiment adopts the PTP layer as a transport layer, but the communication specifications do not limit the present invention. A USB connection initialization method by PTP is well known, and a detailed description thereof will be omitted. Upon the completion of initializing USB connection, preparations for data transfer between the PD printer 1000 and the adaptor 1200 are completed.

In step S102, the adaptor 1200 acquires the direct printing function (Capability) from the PD printer 1000. More specifically, the adaptor 1200 requests, of the connected PD printer 1000, information (Capability) representing what kind of direct printing specifications the PD printer 1000 has. The adaptor 1200 receives the direct printing function (Capability) sent from the PD printer 1000 in response to the request (1402 in FIG. 14). In the second embodiment, Capability is acquired by a request from the adaptor 1200, as described with reference to FIG. 14. However, the present invention is not limited to this, and Capability may be acquired by, e.g., pushing the adaptor 1200 by the PD printer 1000.

In step S103, the adaptor 1200 disconnects the PD printer 1000 by software upon the completion of acquisition of Capability of the PD printer 1000. The reason of software disconnection is as follows.

It is assumed that the adaptor 1200 is connected to a plurality of types of printers. Printers include a model which rejects communication with an external device while communication for direct printing is established. In other words, while the adaptor 1200 is connected, some printers cannot receive a print request from another PC or the like. In this case, if devices connected to a printer have the same direct printing specifications, the above-mentioned problem does not occur because physical connection between one device and the printer is canceled after direct printing with the device is completed.

However, in a case where the adaptor 1200 is connected to the connector of the printer, like the second embodiment, it is assumed that the adaptor 1200 and printer are kept connected organically regardless of whether direct printing is necessary or not. Considering the availability of the printer, it is not preferable to keep the printer and adaptor 1200 connected organically unless communication is necessary. It is, however, difficult to physically disconnect the adaptor 1200 from the printer, and thus communication between the printer and the adaptor is disconnected by software (nonphysically) to release the printer (S103). In the second embodiment, the adaptor 1200 is disconnected by software (nonphysically) by setting the connection with the printer to an open state so as to generate a status equivalent to removal of the adaptor 1200 from the printer.

In the second embodiment, the adaptor 1200 and PD printer 1000 are PTP-connected, and the adaptor 1200 serves as a slave. For this reason, it is difficult to disconnect communication by a program, but the PD printer 1000 can be disconnected from the adaptor 1200 by a program depending on the specifications of an interface. When such an interface is employed, the connection may be released by a program instead of the above-described electrical disconnecting.

In step S104, the adaptor 1200 provides a UI display on it in accordance with Capability of the PD printer 1000 that has been acquired in step S102, as described with reference to FIGS. 6A and 6B. For example, in a case where the PD printer 1000 supports A4 size in "paper size" as one of Capability items of the PD printer 1000, the adaptor 1200 constructs a UI so as to allow the user to select "A4" size on the UI of the adaptor 1200. If no A4 size can be supported by the printer 1000, the adaptor 1200 constructs a UI so as to inhibit the user from selecting "A4" size. Similarly, the UI of the adaptor 1200 is constructed in accordance with various Capability items concerning direct printing (e.g., "paper type" and "whether or not to print a printing date").

Thereafter, the adaptor 1200 can provide the user with a direct printing service on the basis of the UI constructed in accordance with Capability acquired from the PD printer 1000.

In step S105, the flow waits until the adaptor 1200 and a cellular phone 1100 start communication via infrared interfaces 1101 and 1202. After the adaptor 1200 starts communicating with the cellular phone 1100, the flow advances to step S106, and the interface between the adaptor 1200 and the cellular phone 1100 is initialized (2011 and 2012 in FIG. 20).

In step S107, the adaptor 1200 waits for a print request of direct printing from the cellular phone 1100 after the initialization of communication. Upon reception of the print request, the adaptor 1200 receives print data (image file) of direct printing in step S108 (2013 to 2018 in FIG. 20). The print data includes, e.g., image data subjected to direct printing, and control data which describes the print conditions of direct printing. Note that the adaptor 1200 can also establish communication (by software) for direct printing with the PD printer 1000 upon reception of a print instruction. In the second embodiment, however, no communication with the PD printer 1000 is established in this stage, and priority is given to completion of receiving print data from the cellular phone 1100. In step S109, if a reception process of receiving print data for direct printing from the cellular phone 1100 is completed, then the flow advances to step S110, and the adaptor 1200 notifies the cellular phone 1100 that the print data has been received normally. A series of jobs between the adaptor 1200 and the cellular phone 1100 end. In step S109, if the reception process is not completed, then the flow returns to step S108.

Cellular phones 1100 include a model which can not understand execution of direct printing depending on the specifications. In other words, the model only transfers an image file to a USB host (adaptor 1200) without recognizing direct printing. As described above, according to the second embodiment, the cellular phone 1100 need not always have any special direct printing application, and suffices to only transfer selected data (image file) to a connection partner with which communication is established. This is because the adaptor 1200 can convert the image file into a format interpretable by the PD printer 1000 and transfer the converted data to the PD printer 1000. As a result, direct printing can be implemented. In this case, a cellular phone which only transfers image file ends the job upon the completion of file transfer. Accordingly, the adaptor 1200 must quickly ends the job between the cellular phone 1100. For this reason, in the second embodiment, the data transfer job between the adaptor 1200 and the cellular phone 1100 ends at the end of file transfer from the cellular phone 1100.

After all print data necessary for direct printing are received in step S109, the user sets print specifications on the basis of the UI constructed in step S104. Note that setting of the print specifications on the UI may be omitted when printing is done with default print specifications.

In step S111, the adaptor 1200 resumes interface connection (by software) with the PD printer 1000. More specifically, in a case where the adaptor 1200 is physically connected to the PD printer 1000, the interface between the adaptor 1200 and the PD printer 1000 is initialized to establish connection. In step S112, the adaptor 1200 converts print data (image file) received from the cellular phone 1100 into a data format suitable for the direct printing protocol between the adaptor 1200 and the PD printer 1000. In step S113, the adaptor 1200 sequentially transfers the converted print data as direct printing data to the PD printer 1000. After transfer of the direct printing data is completed in step S114, connection between the PD printer 1000 and the adaptor 1200 is disconnected by software (electrically). The flow returns to step S107 again to wait for a print request from the cellular phone 1100.

As described above, the adaptor 1200 according to the second embodiment comprises different communication protocols for the USB and infrared interface. The adaptor 1200 mediates data transmission/reception between a printer and an image supply device (image sensing device (digital camera), a cellular phone with a camera, or image storage device) which transmit and receive data by these different communication protocols. The adaptor 1200 can cause the printer to print image data from the image supply device.

Connection between the adaptor 1200 and the image supply device and that between the adaptor 1200 and the printer are limited to a period during which data are actually exchanged. This setting can prevent a decrease in the performance of the PD printer 1000 and/or cellular phone 1100.

In step S103 of FIG. 27, the adaptor 1200 sets the connection the PD printer 1000 to an open state (disconnect) by software. However, the adaptor 1200 subsequently maintains electrical connection, and can confirm that physical connection with the PD printer 1000 has been maintained. Thus, the adaptor 1200 can subsequently utilize Capability of the PD printer 1000 that has been acquired in step S102. Once the adaptor 1200 is physically disconnected from the PD printer 1000, i.e., removed from the connector, the adaptor 1200 may be connected to another printer which is incompatible with the already acquired Capability. In the worst case, printing at a specification set by the user cannot be executed. A method of solving this problem is shown in FIG. 28.

Figure 28:
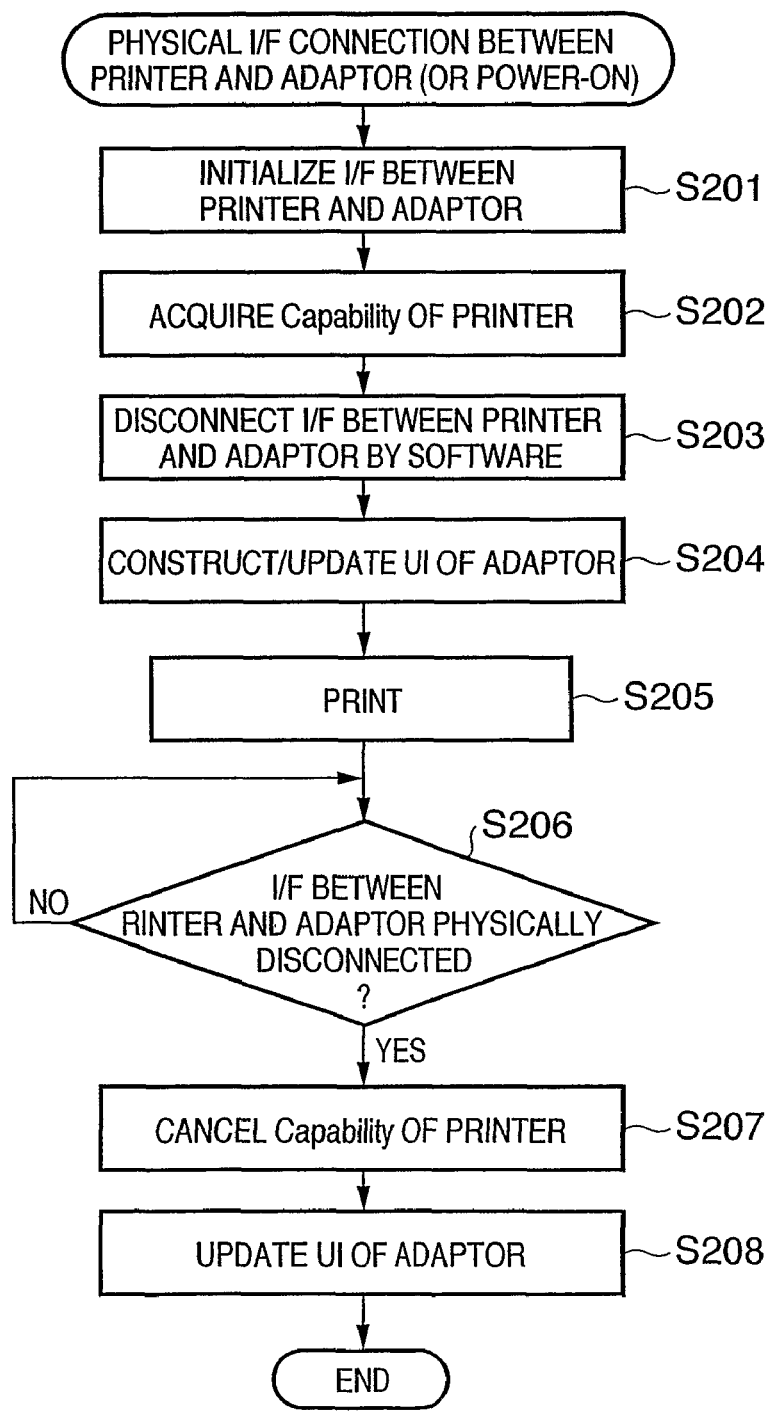
FIG. 28 is a flowchart for mainly explaining a process of connecting and disconnecting the adaptor and a PD printer according to the second embodiment.

FIG. 28 is a flowchart for mainly explaining a process of connecting and disconnecting the adaptor 1200 and the PD printer 1000 according to the second embodiment. A program for executing this process is stored in the ROM 3202 and executed under the control of the CPU 3201. This process starts when it is detected that the PD printer 1000 and adaptor 1200 are connected, or the PD printer 1000 to which the adaptor 1200 is connected is powered.

Processes in steps S201 to S204 are the same as those in steps S101 to S104 in FIG. 27 described above, and a description thereof will be omitted.

Step S205 represents a process of receiving print data (image file) from the cellular phone 1100, and printing by the PD printer 1000. This process corresponds to the processes in steps S105 to S114 of FIG. 27. If the adaptor 1200 is physically disconnected from the PD printer 1000 in step S206, i.e., the adaptor 1200 is removed from the USB connector of the PD printer 1000, the flow advances to step S207 to cancel Capability of the PD printer 1000. In step S208, the UI of the adaptor 1200 is changed to, e.g., a default UI. In other words, UI selection functions are restricted to mandatory functions which are always provided in direct printing.

Note that the adaptor 1200 may have its own electric power supply. In the second embodiment, however, the adaptor 1200 receives electric power from a USB via USB connection between the adaptor 1200 and the PD printer 1000. At this time, the adaptor 1200 desirably uses a nonvolatile memory as a storage means for holding image data transmitted from the cellular phone 1100. As described above, when the adaptor 1200 receives print data (image file) from the cellular phone 1100, it does not establish any I/F with the PD printer 1000. Further, the PD printer 1000 cannot always immediately print when the I/F between the adaptor 1200 and the PD printer 1000 is established after reception of the image file data. In this stage, the PD printer 1000 is not informed that the adaptor 1200 has received and held direct printing data. Thus, the PD printer 1000 may be turned off at the end of a print job that has been already implemented by the PD printer 1000. Furthermore, for example, if an unrecoverable error occurs due to any reason during printing of data from a PC, the PD printer 1000 may be temporarily turned off and then initialized. In this case, in the adaptor 1200 which receives an electric power from the USB of the printer 1000, the power supply interrupts owing to power-off of the PD printer 1000, and image data stored in the memory of the adaptor 1200 is erased. At this time, the adaptor 1200 has already completed receiving process of data from the cellular phone 1100, and cannot notify the cellular phone 1100 that no printing can be completed. In this case, the user of the cellular phone is notified that transfer of image data from the cellular phone 1100 to the adaptor 1200 has ended normally, but no printing of the image data is completed in practice.

It is, therefore, very effective to store data received from the cellular phone 1100 in a nonvolatile memory in the adaptor 1200. When any error occurs before all image data from the cellular phone 1100 are stored in the nonvolatile memory, the adaptor 1200 notifies, of a data reception failure, the cellular phone which has been kept connected, and requests the cellular phone 1100 to transfer image data again.

As image data stored in the adaptor 1200, data received from the cellular phone 1100 may be held as they are, but data processed by direct printing may be held. The above-described operation starts when it is detected that the PD printer 1000 is connected to the adaptor 1200. A similar process is also executed when the PD printer 1000 that connects with the adaptor 1200 is powered.

As described above, the second embodiment has the following effects.

(1) Even if a printer and cellular phone do not have common protocols for direct printing specifications, direct printing between the printer and the cellular phone can be achieved via an adaptor.

(2) Occupation of the PD printer 1000 while the PD printer 1000 cannot shift to a direct printing operation, e.g., during transfer of image data from a cellular phone, can be prevented to increase the availability of the printer.

(3) Since top priority is given to image data reception from a cellular phone during reception of the image data from a cellular phone, the cellular phone can be quickly released. This is effective especially in a case that a cellular phone or an image data supply device (e.g., digital camera) is a battery-driven mobile device.

(4) Even if the PD printer 1000 cannot receive (is not ready for) any direct printing data, data from an image data source can be received by the adaptor. Even if no printer is connected to an adaptor, image data for direct printing from the image data source (cellular phone) can be received by the adaptor to quickly release the image data source.

Modification to Second Embodiment

In the second embodiment, direct printing can be performed even if the PD printer 1000 does not become ready after the adaptor 1200 receives direct printing data, because that the PD printer 1000 is turned off, or because that no PD printer 1000 is connected. To the contrary, the modification will describe a case wherein direct printing can be completed even if an unrecoverable error occurs in the PD printer 1000 during direct printing.

If an unrecoverable error occurs in the PD printer 1000 at an interval between "start of direct printing" (step S113) and "completion of direct printing" (step S114), the print process returns to "initialization of the interface between the printer and the adaptor" (S111) to wait for return of the PD printer 1000. In general, in a case where an unrecoverable error occurs in the PD printer 1000 (at this time, it also becomes impossible to continue printing), a printer power-on/off process or corresponding printer initialization process is performed in order to recover the printer. At this time, the interface is also initialized, and connection between the adaptor 1200 and the printer 1000 is temporarily set to an open state (disconnect). After the PD printer 1000 recovers, the interface is established again. As a direct printing operation, the adaptor 1200 waits for "initialization of the interface between the printer and the adaptor" (S111), as described above, and direct printing can resume.

In a case where the adaptor 1200 receives an electric power from the PD printer 1000, the power supply may be stopped at the same time as initialization of the PD printer 1000 to initialize the adaptor 1200. In this case, if the adaptor 1200 is powered again using a resume function before returning to "initialization of the interface between the printer and the adaptor" (S111), the adaptor 1200 may be controlled so that it can return to "initialization of the interface between the printer and the adaptor" (S111). Note that the resume function for returning to the work that has been done in power-off when the electric power is applied again is well known, and a detailed description thereof will be omitted.

Alternatively, only in a case where the user uses the UI of the adaptor 1200 to designate automatic return, instead of the automatic return specification, printing may be done using the latest direct printing data held in the adaptor 1200. Also in this case, a cumbersome operation of turning on a cellular phone 1100, selecting an image for direct printing, and designating the direct printing can be omitted, greatly contributing to operability.

Similarly, in a case where no PD printer 1000 is connected to the adaptor 1200 and the adaptor 1200 receives direct printing data from the cellular phone 1100 (in this case, the adaptor 1200 has its own electric power supply (not shown)), the adaptor 1200 waits in the state of "physical interface connection between the printer 1000 and the adaptor 1200". In a case where the adaptor 1200 is connected to the PD printer 1000, direct printing can automatically start. Alternatively, only in a case where the user uses the UI of the adaptor 1200 to designate automatic return, instead of the automatic return specification, printing may be done using the latest direct printing data held in the adaptor 1200, as described above.

The above arrangement has the following effects.

(1) Even when an unrecoverable error occurs in the printer during direct printing based on print job from a cellular phone, the direct printing can resume without transferring any print job again from the cellular phone.

(2) Even if the adaptor and printer are not connected to each other upon reception of direct printing data from the cellular phone, direct printing based on the direct printing data can start when the adaptor and printer are connected.

Third Embodiment

In the above-described above, a pure file transfer protocol is utilized for communication between the adaptor 1200 and the cellular phone 1100, and a direct printing protocol is utilized for communication between the adaptor 1200 and the PD printer 1000. In this case, the cellular phone 1100 cannot grasp the progress of a print job to print the transferred print data, and the adaptor 1200 must assist job management. Also, the cellular phone 1100 cannot perform job management such as a print resume instruction in a case where a print job interrupts owing to a paper absence error or the like, or a print job stop instruction. To assist the instructions, the UI and buttons of the adaptor 1200 are required. However, in a case where either the first or second embodiment is uniquely exploited for the above-mentioned job management method, a problem occurs in the following cases.

(1) According to a method of permitting transfer of image data from the cellular phone 1100 upon acceptance of a print job by the PD printer 1000 on the basis of the first embodiment, the user tries to print an image saved in the memory card 3109 of the cellular phone 1100, erase the image from the memory card 3109 after sending the image to the adaptor 1200, and quickly photographs a next image.

In this case, the time when printing is completed is not so important to the user. However, in a case where the cellular phone 1100 sends an image data transfer request to the adaptor 1200 and the adaptor 1200 sends a print request to the PD printer 1000, and if the PD printer 1000 cannot accept the print request because it is executing printing data from the PC 3010, then the adaptor 1200 may interrupt data reception from the cellular phone 1100. The liquid crystal display 1102 of the cellular phone 1100 displays a communication error representing that no data can be transferred. Data communication between the adaptor 1200 and the cellular phone 1100 must wait till the completion of the print process of the data from the PC 3010. Hence, the user of the cellular phone 1100 cannot photograph a new image to miss a photo opportunity, or may give up printing and erase an image from the memory card 3109 to ensure the memory area.

(2) According to a method of permitting transfer of image data from the cellular phone 1100 without waiting for acceptance of a print job by the PD printer 1000 in the second embodiment, in a case where the user of the cellular phone 1100 wants to quickly print an image and go out with the printed result, the user cannot go out till the completion of printing. In a case that the cellular phone 1100 transfers image data to the adaptor 1200 and the adaptor 1200 instructs the PD printer 1000 to print the image, the adaptor 1200 normally ends reception of the image data from the cellular phone 1100 even if the PD printer 1000 is executing printing data from a PC. In this case, the liquid crystal display 1102 of the cellular phone 1100 displays the completion of communication, but actual printing of the image starts after printing the data from the PC 3010 has been completed. Accordingly, in order to go out with the printed image (photo), the user must wait before the user goes out or must print the image using another unoccupied printer. In a case where the user prints the image using another printer and goes out with the printed result (photo), printing of the image by the first PD printer 1000 is executed while the user of the cellular phone 1100 is out, resulting in wasteful printing, or printing and leaving a personal photograph while the user is out.

It is, therefore, effective to switch the adaptor 1200 depending on the user's environment between an operation in a "mode in which whether a print job can be executed at this moment can be determined immediately and explicitly, but the print job can be accepted only a case where it can be executed immediately" on the basis of the first embodiment, and an operation in a "mode in which the execution timing of a print job cannot be guaranteed, but a print job can always be accepted".

Figure 29:
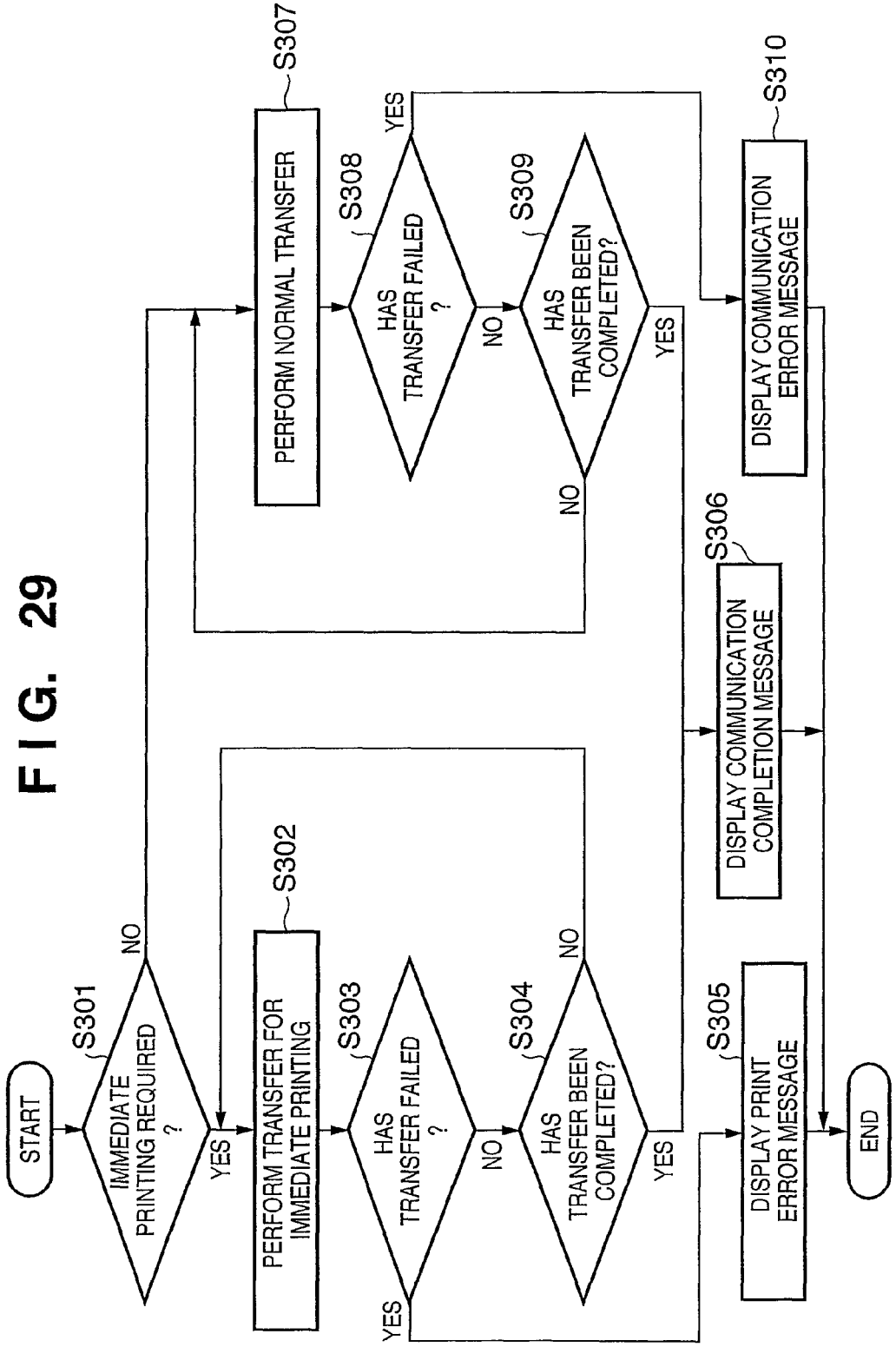
FIG. 29 is a flowchart for explaining a data transfer operation switching & UI process in a cellular phone with a camera according to the third embodiment.

FIG. 29 is a flowchart for explaining a data transfer operation switching & UI process in a cellular phone 1100 with a camera according to the third embodiment of the present invention. In this flowchart, the cellular phone 1100 determines the environment of the user of the cellular phone, and notifies the adaptor 1200 of the determined environment. Assume that at the start of the flowchart, the cellular phone 1100 recognizes that the adaptor 1200 can switch a data transfer process for transmitting image data to the printer 1000. A program for executing this process is stored in the ROM 3101 and executed under the control of the CPU 3103.

In step S301, the cellular phone 1100 determines whether data transfer to the adaptor 1200 is a data transfer process in expectation of immediate printing. The determination method uses an answer from the user to a question, displayed on a liquid crystal display 1102, about whether the user wants immediate printing. If the determination result is "YES", the flow advances to step S302; if "NO", to step S307. The immediate printing data transfer method in the step S302 uses, for example, whether a Name area whose data is transmitted first in an IrDA PUT process holds a specific file name (e.g., IMMEDIATE.JPG). In step S303, the cellular phone 1100 determines whether data transfer has failed or not. If data transfer is successful, then the flow advances to step S304; if data transfer fails, to step S305. In step S305, the cellular phone 1100 determines that immediate printing image transfer has failed because the PD printer 1000 used for printing cannot print at present due to any reason. The cellular phone 1100 displays, on the liquid crystal display 1102, a print error message that printing cannot be executed. Then, the cellular phone 1100 ends the process.

In step S304, the cellular phone 1100 determines whether data transfer has been completed. If data transfer is not completed, the flow advances to step S302, and the cellular phone 1100 executes the above-described data transfer process (S302-S303). Upon the completion of data transfer, the flow advances to step S306, and the cellular phone 1100 determines that the PD printer 1000 used for printing can print and the printer 1000 has accepted the print job from the adaptor 1200. The cellular phone 1100 displays, on the liquid crystal display 1102, a communication completion message that the data transfer is successful. Then, the cellular phone 1100 ends the data transfer process.

If immediate printing is not requested in step S301, then the flow advances to step S307, and the cellular phone 1100 transfers print data by a normal transfer process unlike step S302. The normal data transfer process method uses, for example, whether the Name area whose data is transmitted first in the IrDA PUT process holds a name other than a specific file name (e.g., IMMEDIATE.JPG). In step S308, the cellular phone 1100 determines whether the data transfer has failed or not. If data transfer is successful, then the cellular phone 1100 determines whether the data transfer has been completed. If transfer is not completed, then the flow returns to step S307, and the cellular phone 1100 executes the above-described normal data transfer process.

If the normal data transfer fails in step S308, the flow advances to step S310, the cellular phone 1100 determines that the error is a pure communication error generated in communication between the cellular phone 1100 and the adaptor 1200. The cellular phone 1100 displays a communication error message on the liquid crystal display 1102 at the step S310, and ends the process. If the transfer process has been completed in step S309, the cellular phone 1100 determines that the normal image transfer is successful because communication between the cellular phone 1100 and the adaptor 1200 is successful. The cellular phone 1100 displays a communication completion message on the liquid crystal display 1102 at step S306, and ends the process.

Figure 30:
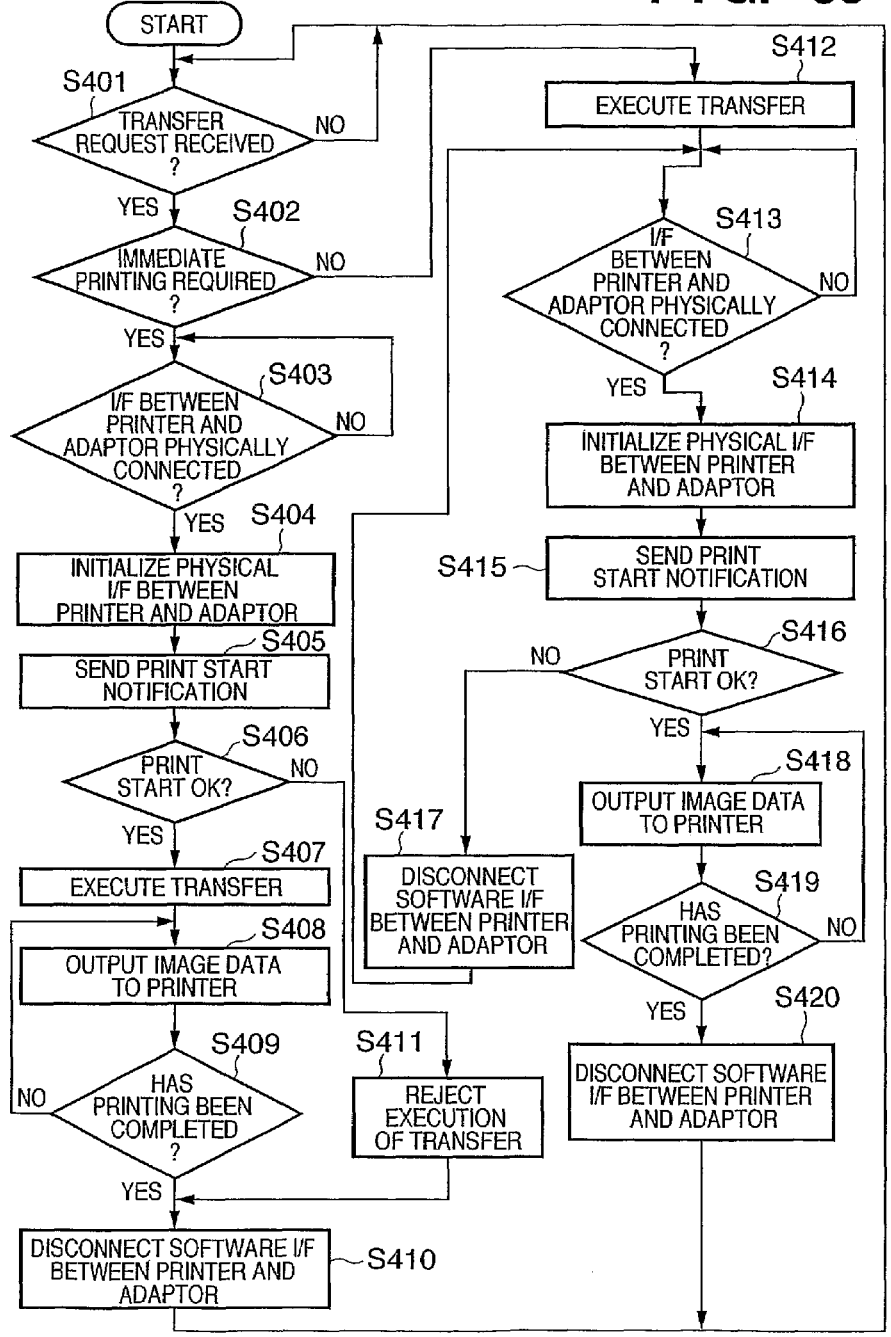
FIG. 30 is a flowchart for explaining a data transfer operation switching & print process by an adaptor according to the third embodiment.
Figure 31:
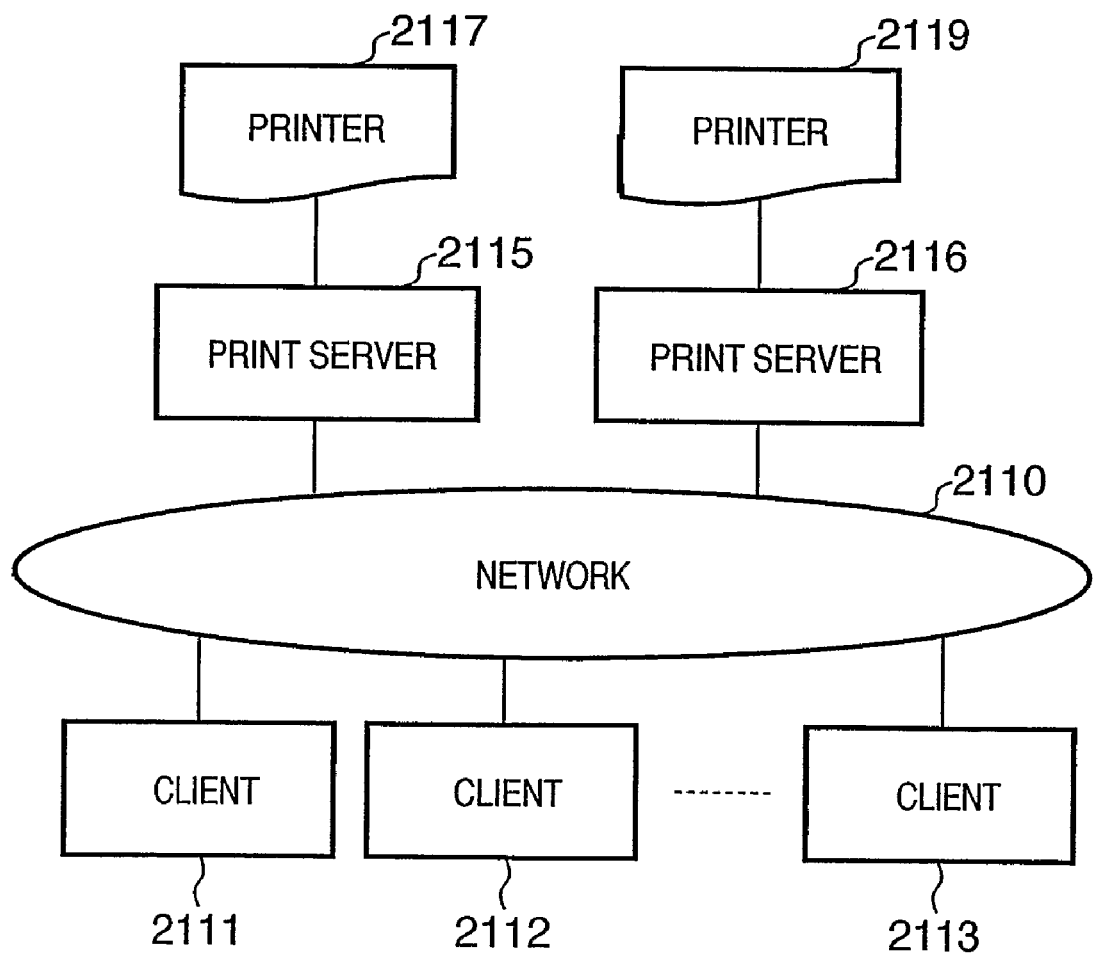
FIG. 31 is a block diagram for explaining a print server system in a conventional PC environment.

FIG. 30 is a flowchart for explaining a data transfer operation switching & print process by the adaptor 1200 according to the third embodiment. Also in this flowchart, the cellular phone 1100 determines the environment of the user of the cellular phone 1100, and notifies the adaptor 1200 of the determined environment. Assume that at the start of the flowchart, the adaptor 1200 recognizes that the cellular phone 1100 can switch a data transfer process for transmitting image data to the adaptor 1200. A program for executing this process is stored in the ROM 3202 and executed under the control of the CPU 3201.

In step S401, the adaptor 1200 determines whether it has received a data transfer request from the cellular phone 1100. If the adaptor 1200 has not received any data transfer request, the flow returns to step S401, and the adaptor 1200 repeats this process until it receives a data transfer request. Upon reception of the data transfer request, the adaptor 1200 determines in step S402 whether the requested data transfer requires immediate printing. As the determination method, when, for example, the Name area whose data is transmitted first in the IrDA PUT process holds a specific file name (e.g., IMMEDIATE.JPG), the adaptor 1200 determines that immediate printing is required. If immediate printing is required (YES in step S402), the flow advances to step S403; if NO, to step S412.

In step S403, the adaptor 1200 determines whether or not the adaptor 1200 is physically connected to the PD printer 1000. If the adaptor 1200 is not connected, it repetitively executes step S403 until it is connected to the PD printer 1000. After the adaptor 1200 is connected to the PD printer 1000, direct printing is initialized between the adaptor 1200 and the PD printer 1000 in step S404. In step S405, the adaptor 1200 notifies the PD printer 1000 of the start of a print job. In step S406, the adaptor 1200 determines whether or not it has received a print start OK response from the PD printer 1000. If NO in step S406, the flow advances to step S411, and the adaptor 1200 rejects the data transfer request from the cellular phone 1100, i.e., notifies the cellular phone 1100 that the data transfer request cannot be executed. After that, the flow advances to step S410.

If the response from the PD printer 1000 is a print start OK response in step S406, the flow advances to step S407, and the adaptor 1200 accepts the data transfer request from the cellular phone 1100 and receives image data sent from the cellular phone 1100. In step S408, the adaptor 1200 executes a print process to transmit print data to the PD printer 1000 on the basis of the received image data. In step S409, the adaptor 1200 determines whether printing by the PD printer 1000 on the basis of the transferred print data has been completed. If printing has not been completed, the flow returns to step S408, and the adaptor 1200 executes the above-described process. If printing has been completed, the adaptor 1200 disconnects the software I/F with the PD printer 1000, and ends the direct printing. Then the flow returns to step S401 to continue the subsequent process.

If no immediate printing is required in step S402, the flow advances to step S412, and the adaptor 1200 accepts the data transfer request from the cellular phone 1100 and receives transferred image data. In step S413, the adaptor 1200 determines whether or not the adaptor 1200 and PD printer 1000 are physically connected. If the adaptor 1200 and PD printer 1000 are not connected, the adaptor 1200 repetitively executes the process in step S413 until the adaptor 1200 is connected to the PD printer 1000. After the adaptor 1200 is connected to the PD printer 1000, the flow advances to step S414, and direct printing is initialized between the adaptor 1200 and the PD printer 1000. In step S415, the adaptor 1200 notifies the PD printer 1000 of the start of a print job. In step S416, the adaptor 1200 determines whether the adaptor 1200 has received a print start OK response from the PD printer 1000. If NO in step S416, the flow advances to step S417, and the adaptor 1200 disconnects the software I/F with the PD printer 1000, and ends the direct printing. Then, the flow returns to step S413. In step S413, the adaptor 1200 continues the subsequent process in expectation that the status of the PD printer 1000 changes and can print or the adaptor 1200 is connected to another printable printer.

If it is determined in step S416 that the printing is possible in step S416, the flow advances to step S418, and the adaptor 1200 transmits print data to the PD printer 1000 on the basis of the image data transferred from the cellular phone 1100, and causes the PD printer 1000 to execute printing. In step S419, the adaptor 1200 determines whether or not printing by the PD printer 1000 has been completed. If the printing has not been completed, the flow returns to step S418, and the adaptor 1200 executes the above-described process. If the printing has been completed, the flow advances to step S420, and the adaptor 1200 disconnects the software I/F with the PD printer 1000, and ends the direct printing. The flow returns to step S401 to continue the subsequent process.

Note that the process described with reference to FIG. 30 is basic. Processes described in the first embodiment may be applied to process steps S403 to S410, or those described in the second embodiment may be applied to process steps S412 to S420.

The criterion (step S301 in FIG. 29) for determining whether or not immediate transfer is necessary is not limited to selection by the user of the cellular phone 1100. For example, in a case where an image file transferred as print data is a JPEG image, it is determined on the assumption of photographic data that data transfer requires immediate printing. In other cases, it is determined on the assumption of an archive that data transfer is normal one. In this way, the cellular phone 1100 may automatically determine the type of data transfer on the basis of the format of a transferred image file. Further, if printing is executed during late-night hours, then the user is less likely to go out, so that the cellular phone 1100 can determine that data transfer is normal one. In other time period (other than late-night hours), the user is likely to go out, such that the cellular phone 1100 determines that the data transfer requires immediate printing. In this fashion, the type of that data transfer may be determined on the basis of the time when printing is designated.

In step S302 of FIG. 29, the immediate printing data transfer method uses, for example, whether the Name area whose data is transmitted first in the IrDA PUT process holds a specific file name (e.g., IMMEDIATE.JPG). However, the present invention is not limited to this, and may use another method, for example, a keyword in "ObjectInfoDataset" of PTP or a vender-specific command (e.g., PTP OperationCode=0x9001).

In step S402 of FIG. 30, whether the immediate printing is required is determined based on whether the Name area whose data is transmitted first in the IrDA PUT process holds a specific file name (e.g., IMMEDIATE.JPG). However, the present invention is not limited to this, and may use another method. For example, whether the immediate printing is required can be determined on the basis of a keyword in the above-mentioned "ObjectInfoDataset" of PTP, or a vender-specific command (e.g., PTP OperationCode=0x9001).

In step S402, whether the immediate printing is required is determined on the basis of information from the cellular phone 1100. However, the present invention is not limited to this, and it may be determined by the adaptor 1200 by itself whether the immediate printing is required or not. In this case, the determination may be based on the above-described image format or current time on which the print is designated. Alternatively, the adaptor 1200 may be equipped with a means for setting whether the immediate printing is necessary or not, and selection by the user may be set as a criterion. A combination of these determination criteria may be used.

The cellular phone 1100 and adaptor 1200 are connected by pure data transfer connection in the first and third embodiments, and by simple direct printing connection in the second embodiment. However, the present invention is not limited to this, and the cellular phone 1100 and adaptor 1200 may be connected by a scheme different from direct printing connection used for connection between the adaptor 1200 and the PD printer 1000. Hence, connection between the cellular phone 1100 and the adaptor 1200 in the first and third embodiments may be achieved by simple direct printing connection, and connection in the second embodiment may be achieved by pure data transfer connection.

The present invention is also achieved even by supplying a software program which implements the functions of the above-described embodiments to the system or apparatus directly or from a remote site and causing the computer of the system or apparatus to read out and execute the supplied program code. The form need not always be a program as long as the functions of the program can be obtained. Hence, to implement the functional process of the present invention by a computer, the program code itself, which is installed in the computer, also implements the present invention. That is, a computer program itself, which implements the functional process of the present invention, is also incorporated in the present invention. In this case, the program can take any form such as an object code, a program to be executed by an interpreter, or script data to be supplied to the OS as long as the functions of the program can be obtained.

As a recording medium to supply the program, for example, a floppy® disk, hard disk, optical disk, magnetooptical disk, MO, CD-ROM, CD-R, CD-RW, magnetic tape, nonvolatile memory card, ROM, or DVD (DVD-ROM or DVD-R) can be used. As another program supply method, a client computer may be connected to a homepage on the Internet using a browser in the computer, and the computer program itself of the present invention or a compressed file containing an automatic install function may be downloaded from the homepage to a recording medium such as a hard disk. A program code that constitutes the program of the present invention may be divided into a plurality of files, and the files may be downloaded from different homepages. That is, a WWW server which prompts a plurality of users to download a program file for implementing the functional process of the present invention by a computer is also incorporated in the claim of the present invention.

The program of the present invention may be encrypted, stored in a storage medium such as a CD-ROM, and distributed to users. Any user who satisfies predetermined conditions may be allowed to download key information for decryption from a homepage through the Internet, execute the encrypted program using the key information, and install the program in the computer.

The functions of the above-described embodiments are implemented not only when the readout program is executed by the computer but also when the OS or the like, which is running on the computer, performs some or all of actual processes on the basis of the instructions of the program.

The functions of the above-described embodiments are also implemented when the program read out from the storage medium is written in the memory of a function expansion board inserted into the computer or a function expansion unit connected to the computer, and the CPU of the function expansion board or function expansion unit performs some or all of actual processes on the basis of the instructions of the program.

The present invention is not limited to the above embodiment, and various changes and modifications can be made thereto within the spirit and scope of the present invention. Therefore, to apprise the public of the scope of the present invention, the following claims are made.

This application claims the benefit of Japanese Application No. 2005-017193, filed Jan. 25, 2005, which is hereby incorporated by reference herein in its entirety.

The invention claimed is:

1. A printing system which prints by outputting, to a printer via an adaptor, image data held by an image supply device,
the adaptor, comprising
a first interface configured to communicate with the printer by a first communication protocol, and
a second interface configured to communicate with the image supply device by a second communication protocol different from the first communication protocol; and
the printing system being configured to operate in
a first operation mode in which image data from the image supply device is received by the second interface, and before completion of receiving the image data by the second interface, a print job for printing image data that is received before the completion of receiving the image data by the second interface is issued from the adaptor to the printer via the first interface; and
a second operation mode in which image data from the image supply device is received by the second interface, and after completion of receiving the image data by the second interface, a print job for printing image data whose reception has been completed by the second interface is issued from the adaptor to the printer via the first interface;
the printing system comprising:
a selection unit configured to select either of the first operation mode and the second operation mode in which the adaptor issues the print job; and
a switching unit configured to switch between the first operation mode and the second operation mode in accordance with a selection result of the selection unit,
wherein the selection unit selects either the first operation mode or the second operation mode based on at least one of a file name, an image format type, a transfer time and accessory information of the image data received from the image supply device.

2. The printing system according to claim 1, wherein the first interface includes a physical signal connection, and the second interface includes wireless communication.

3. An image supply device for outputting image data to a printer via an adaptor, comprising:
an interface configured to communicate with the adaptor; and
a selection unit configured to select either of a first operation mode in which a print job for printing image data that is received before completion of transmitting image data is issued from the adaptor to the printer before completion of transmitting image data to the adaptor via the interface, and a second operation mode in which a print job for printing image data whose transmission has been completed is issued to the printer via the interface after completion of transmitting image data to the adaptor via the interface,
wherein said selection unit selects either the first operation mode or the second operation mode based on at least one of a file name, an image format type, a transfer time and accessory information of the image data.

4. An adaptor for mediating image data held by an image supply device to output the image data to a printer, and causing the printer to print, comprising:
a first interface configured to communicate with the printer by a first communication protocol;
a second interface configured to communicate with the image supply device by a second communication protocol different from the first communication protocol;
a selection unit configured to select either of a first operation mode in which image data from the image supply device is received by the second interface, and before completion of receiving the image data via the second interface, a print job for printing image data that is received before the completion of receiving the image data by the second interface is issued to the printer via the first interface, and a second operation mode in which image data from the image supply device is received by the second interface, and after completion of receiving the image data via the second interface, a print job for printing image data whose reception has been completed by the second interface is issued to the printer via the first interface; and
a switching unit configured to switch between the first operation mode and the second operation mode in accordance with a selection result by the selection unit,
wherein the selection unit selects either the first operation mode or the second operation mode based on at least one of a file name, an image format type, a transfer time and accessory information of the image data received from the image supply device.

5. The adaptor according to claim 4, wherein the first interface includes a physical signal connection, and the second interface includes wireless communication.

6. A method of controlling an adaptor which mediates image data held by an image supply device to output the image data to a printer, and causes the printer to print, the method comprising:
a first communication step of communicating with the printer by a first communication protocol;
a second communication step of communicating with the image supply device by a second communication protocol different from the first communication protocol;
a selection step of selecting either of a first operation mode in which image data from the image supply device is received in the second communication step, and before completion of receiving the image data in the second communication step, a print job for printing image data that is received before the completion of receiving the image data by the second interface is issued to the printer via a first interface, and a second operation mode in which image data from the image supply device is received in the second communication step, and after completion of receiving the image data in the second communication step, a print job for printing image data whose reception has been completed by the second interface is issued to the printer via the first interface; and a switching step of switching between the first operation mode and the second operation mode in accordance with a selection result in the selection step, wherein in said selection step, either the first or the second operation mode is selected based on at least one of a file name, an image format type, a transfer time and accessory information of the image data received from the image supply device.

* * * * *